US007976267B2

(12) United States Patent
Burrell, IV

(10) Patent No.: US 7,976,267 B2
(45) Date of Patent: Jul. 12, 2011

(54) HELIX TURBINE SYSTEM AND ENERGY PRODUCTION MEANS

(76) Inventor: James W. Burrell, IV, Union, NJ (US)

(*) Notice: Subject to any disclaimer, the term of this patent is extended or adjusted under 35 U.S.C. 154(b) by 0 days.

(21) Appl. No.: 12/853,483

(22) Filed: Aug. 10, 2010

(65) Prior Publication Data

US 2011/0006542 A1    Jan. 13, 2011

(51) Int. Cl.
*F03D 3/06* (2006.01)
(52) U.S. Cl. .............. 415/4.2; 416/9; 416/176; 415/4.4; 415/127; 415/72; 415/208.1
(58) Field of Classification Search .......... 415/4.2, 415/4.4, 126, 127, 208.1, 65, 72; 416/123, 416/176, 111, 9; 290/44, 55
See application file for complete search history.

(56) References Cited

U.S. PATENT DOCUMENTS

| | | | |
|---|---|---|---|
| 1,697,574 A | | 1/1929 | Savonius |
| 1,766,765 A | | 6/1930 | Savonius |
| 4,047,834 A | * | 9/1977 | Magoveny et al. .......... 415/53.1 |
| 4,260,325 A | * | 4/1981 | Cymara .................. 415/4.4 |
| 4,269,563 A | * | 5/1981 | Sharak et al. ............. 415/186 |
| 4,293,274 A | | 10/1981 | Gilman |
| 4,369,629 A | * | 1/1983 | Lockwood ................ 60/698 |
| 4,606,697 A | * | 8/1986 | Appel .................... 415/4.4 |
| 4,715,776 A | | 12/1987 | Benesh |
| 4,784,568 A | | 11/1988 | Benesh |
| 4,830,570 A | | 5/1989 | Benesh |
| 4,838,757 A | | 6/1989 | Benesh |
| 5,391,926 A | | 2/1995 | Stanley et al. |
| 5,494,407 A | | 2/1996 | Benesh |
| 5,852,331 A | | 12/1998 | Giorgini |
| 6,283,711 B1 | | 9/2001 | Borg et al. |
| 6,428,275 B1 | | 8/2002 | Jaakkola |
| 6,465,899 B2 | | 10/2002 | Roberts |
| 6,481,957 B1 | | 11/2002 | Brill |
| 6,538,340 B2 | | 3/2003 | Elder |
| 6,910,873 B2 | | 6/2005 | Kaliski |
| 7,132,760 B2 | | 11/2006 | Becker |
| 7,220,107 B2 | | 5/2007 | Kaneda |
| 7,241,105 B1 | | 7/2007 | Vanderhye et al. |
| 7,314,346 B2 | | 1/2008 | Vanderhye et al. |
| 7,329,965 B2 | | 2/2008 | Roberts et al. |
| 7,344,353 B2 | | 3/2008 | Naskali et al. |
| 7,362,004 B2 | | 4/2008 | Becker |
| 7,371,135 B1 | | 5/2008 | Vanderhye et al. |

* cited by examiner

*Primary Examiner* — Ninh H Nguyen
(74) *Attorney, Agent, or Firm* — Ezra Sutton, PA

(57) ABSTRACT

A helical turbine with a circular member attached to one end for redirecting axially flowing fluid into perpendicularly flowing fluid. A fluid diverter for redirecting substantially perpendicular flowing fluid into axially flowing fluid. A hollow circular member attached to an opposite end of the turbine allowing substantially axial flowing fluid into one end of turbine. A drive shaft of at least one generator is in continuous contact with the peripheral edge of the solid or hollow circular member producing faster rpm. A turbine assembly mounted on a rooftop utilizing accelerated wind. Fluid diverters increasing fluid flow into the helical turbine's receding blades. A fluid diverter preventing fluid from hitting turbine's oncoming blades. A tail section for maintaining optimal direction into oncoming fluid. Two counter rotating turbines where the attached circular member's edges are in continuous contact. Multiple turbine body assemblies, using different combinations of disclosed elements, produce multiple preferred embodiments.

20 Claims, 15 Drawing Sheets

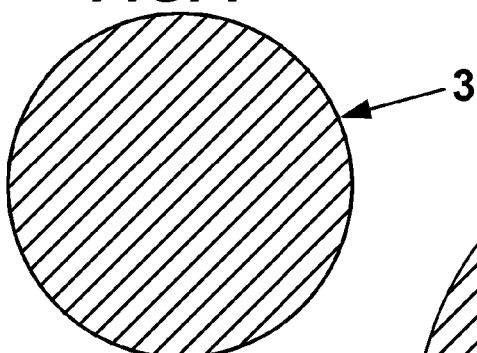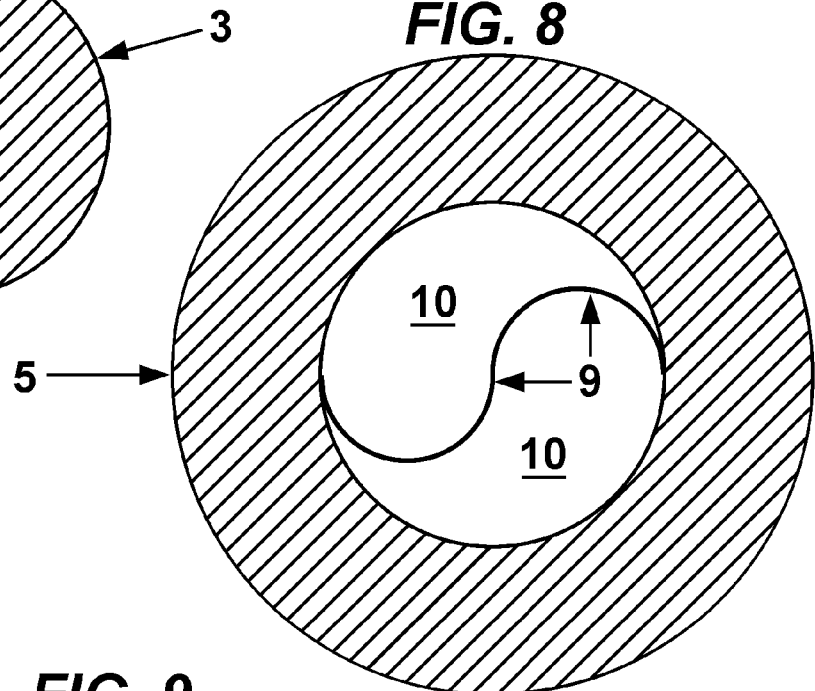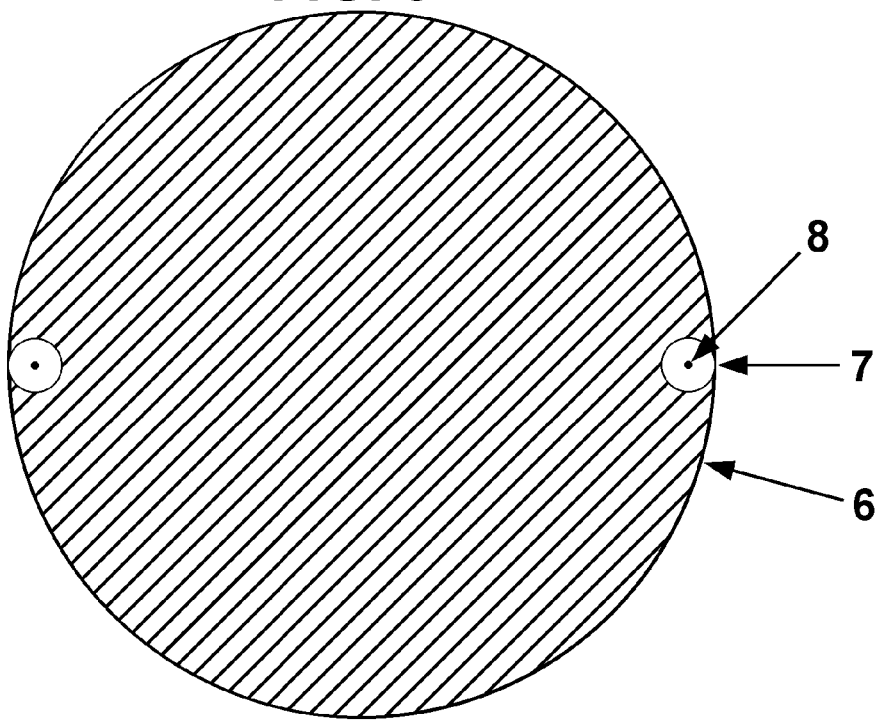

HELIX TURBINE SYSTEM AND ENERGY PRODUCTION MEANS

FIELD OF THE INVENTION

The present invention relates to multiple designs, arrangements and uses of omnidirection Savonius type turbines, omnidirection helix turbines and low pressure turbines for extracting and converting the kinetic energy from moving fluids (wind and water) into mechanical rotary energy for the preferred production of electricity.

DESCRIPTION OF THE PRIOR ART

There are many prior art disclosures and uses of omnidirection Savonius type turbines, omnidirection helix turbines and low pressure turbines to harness the kinetic energy from moving fluids, mostly the wind. Savonius' first patent, U.S. Pat. No. 1,697,574, was a vertical two bladed rotor designed to be powered by wind or flowing water. Since then, many attempts to use or modify the Savonius type turbine invention have been made. The most notable examples are found in U.S. Pat. Nos. 1,766,765, 4,293,274, 4,715,776, 4,784,568, 4,830,570, 4,838,757, 5,391,926, 5,494,407, 5,852,331, 6,283,711, 6,428,275, 6,465,899, 6,481,957, 6,538,340, 6,910,873, 7,132,760, 7,220,107, 7,241,105, 7,314,346, 7,329,965, 7,344,353, 7,362,004 and 7,371,135. There are other prior art references using the Savonius type turbine and helical turbine designs not mentioned or referenced. All of the Savonius type turbines and prior art turbines are connected to an axial drive shaft where the axial drive shaft end is attached to an alternator or some type of generator for harnessing the mechanical rotary energy from the spinning turbine and producing electricity.

The prior art production of omnidirection Savonius type turbines, omnidirection helix turbines and low pressure turbines, have all been previously manufactured using two or more blades permanently fastened to two end caps or an axial drive shaft. The blades are usually molded fiberglass or formed metal panels, instead of structurally molded and reinforced carbon fiber or nanotube yarn fabric impregnated with some type of resin for structural rigidity reinforcement. The preferred embodiments of the present invention preferably use lightweight advanced materials for the vanes and other elements.

None of the prior art designs or solutions to improve the omnidirection Savonius type turbine, omnidirection helix turbine, low pressure turbine or any prior art turbine greatly improves the efficiency of harnessing the kinetic energy from moving fluids, extracting the most mechanical energy from a spinning turbine and converting the rotary motion into electricity.

OBJECTS OF THE INVENTION

It is an object of the present invention to provide multiple means of extracting the most kinetic energy from directional, omnidirectional and/or turbulent fluid movement using a multitude of modified preferably helix turbine designs and apparatuses to increase efficiencies. The more vanes the present invention's turbine has, the more efficient it is at converting kinetic energy from directional, omnidirectional and/or turbulent fluid movement into mechanical rotary energy. A preferably cupped helix turbine vane has a greater ability to capture kinetic energy from directional, omnidirectional and/or turbulent fluid. These improvements allow the present invention to begin rotating and producing electricity in wind speeds slower than one mile per hour.

It is another object of the present invention to provide a circular disk element, with a circumference at least equal to the circumference of the peripheral edges of a helix turbine's blades, permanently attached to one end of the helix turbine, for redirecting axially flowing fluid exiting one end of the helix turbine's blades and redirecting the fluid flow to flow perpendicular to the axis. The use of a circular disk element will increase the rotational speed of a preferable helix turbine.

It is still another object of the present invention to provide a conical or dome shaped shroud or housing located on at least one end of the helix turbine's blades, for diverting perpendicularly flowing fluid into axially flowing fluid. The conical or dome shaped shroud or housing will increase the amount of fluid entering the helix turbine's blades and will increase the rotational speed of a preferable helix turbine.

It is yet another object of the present invention to provide multiple improvements for extracting more rotational mechanical energy from spinning turbines.

It is a further object of the present invention to provide a way of increasing the amount of electricity produced using at least one generator or alternator positioned at an outer peripheral edge of a spinning circular element attached to at least one end of a preferable helix turbine's blades or attached to a turbine's drive shaft.

It is also an object of the present invention to provide a turbine assembly that allows it to be installed on top of telephone poles, cell towers, light poles, mountain tops, pitched rooftops, tops of buildings, electrical transmission towers, etc.

Finally, it is another object of the present invention to provide a means of extracting the most kinetic energy from unidirectional or multi-directional flowing fluid using baffles, diffusers, diverters or concentrators positioned to divert, maximize and increase fluid volume and speed entering a turbine's receding blades, and secondly, to block and prevent the negative interaction between a directional flowing fluid interacting with and impacting the one half of the oncoming turbine's blades, which inversely slows the rotational speed of a turbine's blades.

These and other objects and advantages of the present invention are provided within this patent application. The present invention can be produced using existing types of omnidirection Savonius type turbines, omnidirection helix turbines and low pressure axial turbines. A future patent application will be directed towards improving and manufacturing omnidirection Savonius type turbines, omnidirection helix turbines and low pressure axial turbines.

SUMMARY OF THE INVENTION

In order to accomplish the objects of the present invention, the turbine system, preferably a helix turbine system, uses the following improvements to and modifications of a turbine's design for increasing the method of converting the kinetic energy from moving fluids into rotational mechanical energy, therefore increasing the amount of rotations per minute with each improvement:

A circular disk, with a circumference at least equal to the circumference of the peripheral edges of a preferable helix turbine, is perpendicularly and permanently attached to at least one end of the helix turbine's blades, for converting axially flowing fluid and diverting it into perpendicularly flowing fluid.

A conical or dome shaped shroud or housing positioned and secured to at least one end of a helix turbine for converting perpendicularly flowing fluid into axial flowing fluid.

A hollow circular baseplate, with a circumference at least equal to the circumference of the peripheral edges of a preferable helix turbine, is perpendicularly and permanently attached to at least one end of the helix turbine's blades and in direct contact with at least one drive shaft of a mini generator or alternator, for producing much faster revolutions per minute on the drive shafts of the mini generators or alternators without the use of a gearbox.

Two counter rotating helical turbines, where the top and bottom peripheral edges of the circular disc and hollow circular disc are perpendicularly and permanently attached to both ends of the helix turbine's blades and are in continuous contact, and a preferably aerodynamically triangular shaped baffle for preventing the oncoming fluid from impacting the oncoming helix turbine's blades and diverting the oncoming fluid into the receding helix turbine's blades for producing faster rotational speeds.

A helix turbine assembly using a series of helix turbines with preferably aerodynamic fluid diverters for diverting and concentrating fluid into each of the rotating turbine's receding blades and for always pointing the series of helix turbines into the oncoming wind or fluid.

A rooftop mounted helix turbine assembly for producing electricity using the perpendicularly flowing wind and the accelerated and turbulent almost vertically flowing wind hitting a pitched rooftop or wind flowing over a flat roof building.

A method of generating electricity, which exponentially increases the amount of electricity that one turbine assembly can produce based on; the circumference of the preferably hollow circular disk perpendicularly and permanently attached to the bottom of the helix turbine, the circumference of a mini generator's or alternator's axial drive shaft and the number of mini generators or alternators used.

A method of using preferably aerodynamic fluid diverters and concentrators to increase a preferable helix turbine's rotational speed, in relation to wind speed, and to block and prevent windward fluid from impacting with the oncoming turbine's blades in the multiple preferred embodiments.

A multitude of modifications and enhancements can be made the preferred embodiments and elements of the present preferably helical turbine system invention and the multitude of prior art turbines without departing from the spirit and scope of this invention as a whole.

These and other objects, features and advantages of the present invention will be better understood in connection with the following drawings and descriptions of the preferred embodiments.

DESCRIPTION OF THE DRAWINGS

For a better understanding of the invention as well as other objects, features and advantages thereof, reference is made to the following detailed description to be read in conjunction with the accompanying drawings, wherein:

FIG. 7 shows an overhead perspective view of a circular disk, with a circumference at least equal to the circumference of the peripheral edges of the helix turbine's blades.

FIG. 8 shows an overhead perspective view of a hollow circular disk, with a circumference at least equal to the circumference of the peripheral edges of the helix turbine's blades, and an inside attaching surface for permanent attachment to the bottom of the helix turbine's blades and holes for letting fluid enter through the bottom of the hollow circular disc.

FIG. 9 shows an overhead perspective view of a stationary baseplate for holding mini generators or alternators.

LIST OF REFERENCE NUMBERING

Figure 1A:
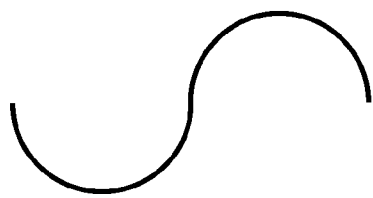
FIG. 1A shows a cross sectional view, perpendicular to the axis, of a two-bladed helix turbine, where each blade is connected at the axis.

In the drawings, the following reference numerals have the following general descriptions:

0 shows a perpendicularly flowing fluid redirected into an axially flowing fluid.

00 shows an axially flowing fluid redirected into a perpendicularly flowing fluid.

1 shows a multi-blade helix turbine blade.

2 shows an axial drive shaft running the length of the helix turbine blade axis.

3 shows a circular disk with a circumference equal to the circumference of the peripheral edges of the helix turbine's blades 1 perpendicularly attached to the top of the helix turbine's blades 1.

4 shows a conical or dome shaped shroud or housing, having a bottom circumference preferably larger than the circumference of the peripheral edges of the helix turbine's blades 1, placed below the helix turbine's blades 1 for diverting horizontal airflow into vertical airflow.

5 shows a hollow bottom circular disc with a circumference equal to or greater than the circumference of the peripheral edges attached 9 to the bottom of the helix turbine's blades and holes 10 for letting updraft air enter through the bottom of the helix turbine's blades 1.

6 shows a stationary baseplate for holding mini generators or alternators 7 in contact with the peripheral edges of the hollow bottom circular disc 5.

7A shows an axially located generator or alternator for harnessing rotational energy from a rotating axial drive shaft 2.

7 shows at least one mini generator or alternator positioned where the peripheral edges of the axial drive shaft 8 is in continuous contact with the peripheral edges of the attached hollow bottom circular disc 5.

8 shows a mini generator's or alternator's axial drive shaft.

9 shows a turbine blade 1 attaching surface on the middle of the hollow bottom circular disc 5 with holes 10 for letting updraft air enter through the bottom of the helix turbine's blades 1.

10 shows holes for letting updraft air enter through the hollow bottom circular disc 5 into the bottom of the helix turbine's blades 1.

11 shows a triangular shaped preferably aerodynamic fluid diverter diverting fluid into the outer two receding halves of the rotating helix turbine blade assembly increasing kinetic energy of a fluid and decreasing drag on the oncoming inner two halves of the rotating helix turbine blade assembly.

12 shows a point where the preferably aerodynamic fluid diverter begins dividing and diverting fluid into the outer two receding halves of the rotating helix turbine blade assembly.

13 shows a point where the fluid concentrator diverts fluid into the outer two receding halves of the rotating helix turbine blade assembly.

14 shows a honeycomb baseplate.

15 shows a top for the helix turbine assembly.

16 shows vertical support rods.

17 shows a top peripheral edge of the helix turbine.

18 shows a pitched rooftop.

19 shows a preferably aerodynamic fluid diverter for diverting and concentrating fluid into the rotating turbine's receding blade.

20 shows a fulcrum pivot point.

21 shows a rotatable aerodynamic shroud.

22 shows a windward preferably aerodynamic fluid diverter and concentrator for blocking and preventing oncoming fluid from impacting with the oncoming helix turbine's blades and diverting the oncoming fluid into the receding helix turbine's blades.

23 shows a windward preferably aerodynamic fluid diverter and concentrator for diverting outer peripheral oncoming fluid into the receding helix turbine's blades.

24 shows a leeward tail member fluid diverter for compensating for the oncoming fluid induced torque produced by the non-linear location of the preferably aerodynamic fluid diverter 23 and the drag produced by the preferably aerodynamic fluid diverter 22.

25 shows a rotatable bearing preferably attached to an axial drive shaft 2 and a bottom stationary baseplate 6 or 14 and attached to an axial drive shaft 2 and a preferably rotatable aerodynamic shroud 21 on a top and bottom outer edge surface.

26 shows a top windward preferably aerodynamic fluid diverter and concentrator for diverting outer peripheral oncoming fluid into the receding helix turbine's blades.

27 shows a bottom windward preferably aerodynamic fluid diverter and concentrator for diverting outer peripheral oncoming fluid into the receding helix turbine's blades.

DETAILED DESCRIPTION OF THE PREFERRED EMBODIMENTS

According to the present invention, the foregoing and other objects and advantages are attained by providing a turbine assembly and helical turbine system with a multitude of improvements for extracting the most kinetic energy from moving fluids while obtaining the maximum amount of mechanical rotational energy from a spinning turbine. In order to more fully understand the present invention, during the course of this description, the turbine assembly, helical turbine system, energy production method and preferred embodiments, will be labeled and explained to easily identify like elements according to the different embodiments which illustrate the presently disclosed invention. The scope of the invention is best defined by the appended claims and the description provided herein. Additional objects of the present invention will become apparent as the description proceeds.

Figure 1B:
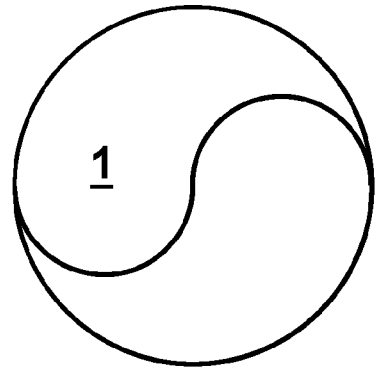
FIG. 1B shows an axial end perspective view of a of a two-bladed helix turbine, where each blade is connected at the axis.
Figure 2A:
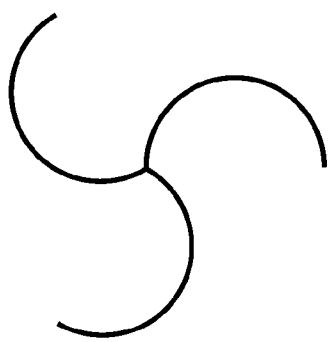
FIG. 2A shows a cross sectional view, perpendicular to the axis, of a three-bladed helix turbine, where each blade is connected at the axis.
Figure 2B:
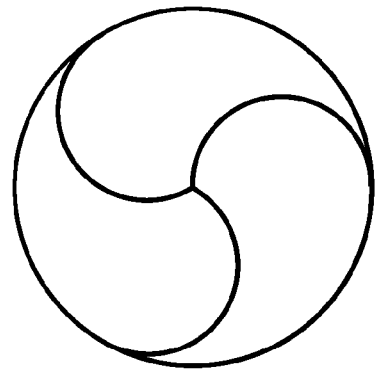
FIG. 2B shows an axial end perspective view of a of a three-bladed helix turbine, where each blade is connected at the axis.
Figure 3A:
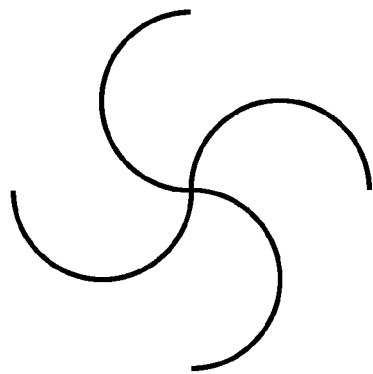
FIG. 3A shows a cross sectional view, perpendicular to the axis, of a four-bladed helix turbine, where each blade is connected at the axis.
Figure 3B:
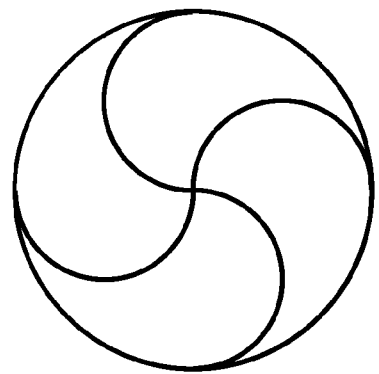
FIG. 3B shows an axial end perspective view of a of a four-bladed helix turbine, where each blade is connected at the axis.
Figure 4A:
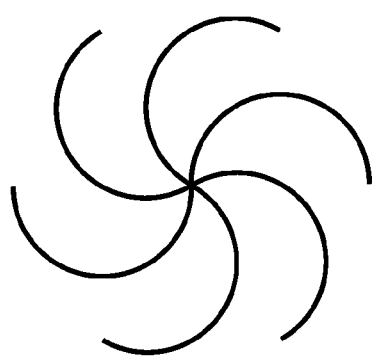
FIG. 4A shows a cross sectional view, perpendicular to the axis, of a six-bladed helix turbine, where each blade is connected at the axis.
Figure 4B:
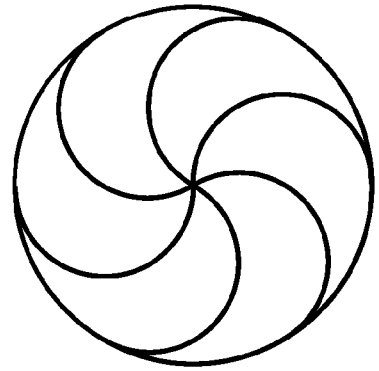
FIG. 4B shows an axial end perspective view of a of a six-bladed helix turbine, where each blade is connected at the axis.

The invention disclosed in the present patent application preferably uses two or more preferably axially connected helical bladed turbines. FIGS. 1-4 show helix turbines without axial drive shafts. Preferred embodiments of the present invention's helix turbines can be manufactured with or without axial drive shafts. FIG. 1A shows a cross sectional view of a two-bladed helix turbine 1 and FIG. 1B shows an axial end perspective view of said two-bladed helix turbine 1, where each blade is connected at the axis. FIG. 2A shows a cross sectional view of a three-bladed helix turbine and FIG. 2B shows an axial end perspective view of said three-bladed helix turbine, where each blade is connected at the axis. FIG. 3A shows a cross sectional view of a four-bladed helix turbine and FIG. 3B shows an axial end perspective view of said four-bladed helix turbine, where each blade is connected at the axis. FIG. 4A shows a cross sectional view of a six-bladed helix turbine and FIG. 4B shows an axial end perspective view of said six-bladed helix turbine, where each blade is connected at the axis. Multiple embodiments of the present invention preferably use only helical type turbines where the blades are preferably connected to an axial drive shaft and do not use the open type Savonius turbine with at least two axially parallel blades that are not connected to an axial drive shaft. More turbine blades increases the efficiency of the turbine and apparatus assemblies.

Figure 5:
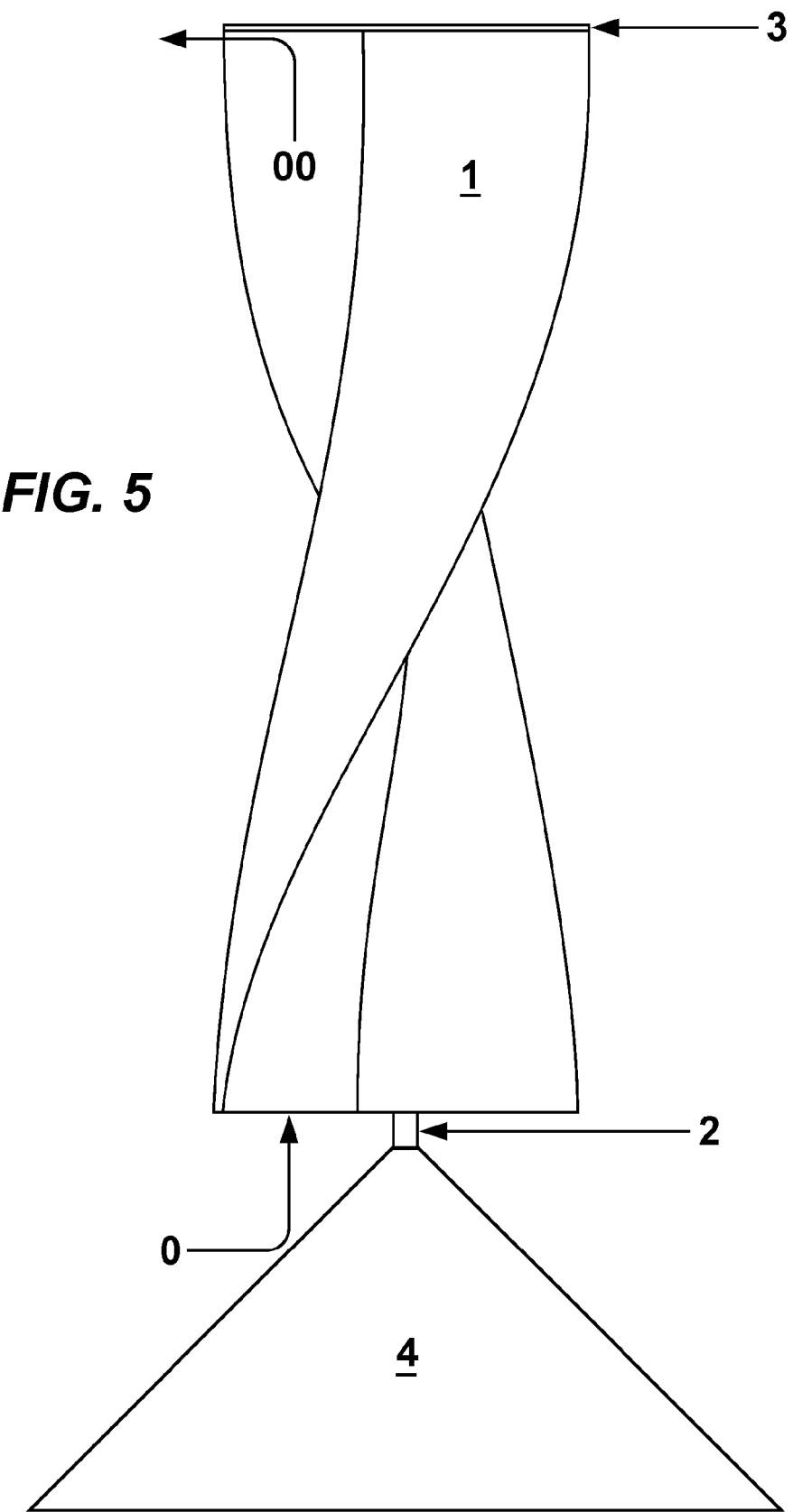
FIG. 5 shows a vertical perspective view of a prior art two-bladed helix turbine assembly with a circular disk, with a circumference at least equal to the circumference of the peripheral edges of the helix turbine's blades, perpendicularly and permanently attached to the top of the helix turbine's blades for diverting axially flowing fluid into perpendicularly flowing fluid; and a conical or dome shaped shroud or housing, with a bottom circumference preferably larger than the circumference of the peripheral edges of the helix turbine's blades with an axial hole larger than the circumference of the drive shaft, located below the helix turbine's blades for diverting perpendicularly flowing fluid into axially flowing fluid.

FIG. 5 shows a vertical perspective view of a prior art two-bladed helix turbine 1 assembly with the first two of the present invention's prior art improvements. Looking at the two-bladed helix turbine 1 assembly from the top, the helix turbine 1 spins clockwise. In Bernoulli's principle (theorem or effect), which relates pressure, velocity and height for a non-viscous fluid with a steady flow, when a fluid flows horizontally, as the speed of a fluid increases, the pressure the fluid exerts decreases. The lift of an airplane wing increases as the speed of the plane increases. The air flows faster over the curved top of the wing than underneath and the upward pressure exerted by the air under the wing is greater than the pressure exerted downward above the wing, resulting in lift. As fluid flows, perpendicularly to the axis, across the rotating top and bottom surfaces of the open ended helix turbine 1, a vacuum is created on the rotating top and bottom ends of the open ended helix turbine 1. The rotating top end of the open ended helix turbine 1 produces a greater vacuum than the rotating bottom end of the open ended helix turbine 1. First, a circular disk 3, with a circumference at least equal to the circumference of the peripheral edges of the helix turbine's 1 blades, is perpendicularly and permanently attached to the top of the helix turbine's 1 blades for diverting axially flowing fluid into perpendicularly flowing fluid 00. This will increase the rotational speed of the helix turbine 1. Second, a conical or dome shaped shroud or housing 4, with a bottom edge circumference preferably at least larger than the circumference of the peripheral edges of the helix turbine's 1 blades with an axial hole larger than the circumference of the drive shaft 2, is positioned and located below the helix turbine 1 blades for diverting perpendicularly flowing fluid into axially flowing fluid 0. This will increase the amount of fluid entering the bottom of the helix turbine's blades 1 and will increase the rotational speed of the helix turbine 1.

Figure 6:
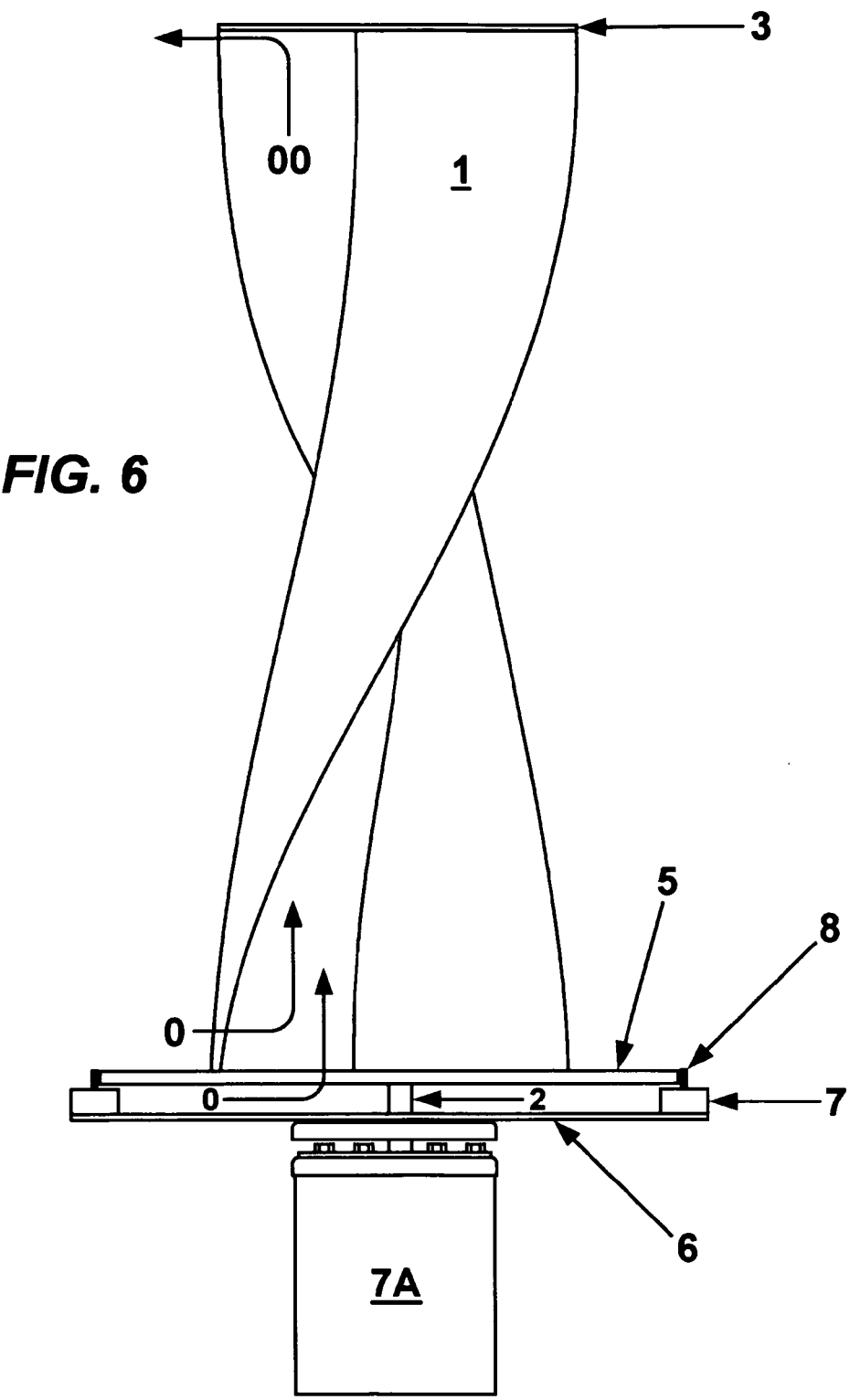
FIG. 6 shows a vertical perspective view of the helix turbine assembly of FIG. 5, without the bottom conical or dome shaped shroud or housing, axially mounted on an axial generator or alternator, where the bottom of the helix turbine is perpendicularly and permanently attached to a hollow circular baseplate, with a circumference at least equal to the circumference of the peripheral edges of the helix turbine's blades, with holes for letting redirected vertical updraft wind enter through the hollow circular baseplate into the bottom of the helix turbine's blades and a stationary baseplate for holding the peripheral edges of mini generator's or alternator's drive shafts in continuous contact with the peripheral edges of the rotating hollow circular baseplate.

FIG. 6 shows the present invention's third prior art improvement in a vertical perspective view of the helix turbine 1 assembly of FIG. 5 axially mounted on an axial generator or alternator 7A, without the bottom conical or dome shaped shroud or housing 4, where the bottom edge of the helix turbine 1 is perpendicularly and permanently attached 9 to a hollow circular baseplate 5, with a circumference at least equal to the circumference of the peripheral edges of the helix turbine's 1 blades, with holes 10 for letting redirected vertical updraft wind 0 enter through the hollow circular baseplate 5 into the bottom of the helix turbine's 1 blades and a stationary baseplate 6 for holding the peripheral edges of mini generator's or alternator's 7 drive shafts 8 in continuous contact with peripheral edges of the hollow circular baseplate 5. The best method of continuous contact between the mini generator's or alternator's 7 drive shafts 8 and the hollow circular baseplate 5 is having the hollow circular baseplate's 5 outer edge made with geared teeth and each of the mini generator's or alternator's 7 drive shafts 8 made with the matching geared teeth. The hollow circular baseplate 5 shown, has a circumference larger than the circumference of the peripheral edges of the helix turbine's 1 blades. With the dimensions shown, when the axial drive shaft 2 is rotating at 100 rpm, each mini generator's or alternator's 7 drive shaft 8 is rotating at 7,800 rpm. The more mini generators or alternators 7 attached, the more electricity that can be produced. With the dimensions shown, 36 mini generators or alternators 7 could be installed on the stationary baseplate 6 for generating electricity. Thirty-six mini generators or alternators 7 are cheaper than and produce more electricity than one massive generator or alternator 7A. Generating electricity increases exponentially, based on the circumference of the hollow circular disk 5 attached to the bottom of the helix turbine 1, the circumference of the mini generator's or alternator's 7 axial drive shaft 8 and the number of mini generators or alternators 7 used.

FIG. 7 shows an overhead perspective view of a circular disk 3, with a circumference at least equal to the circumference of the peripheral edges of the helix turbine's 1 blades.

FIG. 8 shows an overhead perspective view of a hollow circular disk 5, with a circumference at least equal to the circumference of the peripheral edges of the helix turbine's 1 blades, and an inside attaching surface 9 for permanent attachment to the bottom of the helix turbine's 1 blades and holes 10 for letting fluid enter through the bottom of the hollow circular disc 5.

FIG. 9 shows an overhead perspective view of a stationary baseplate 6 for holding mini generators or alternators 7. Only two mini generators or alternators 7 are shown, but based on the dimensions in the drawings, 36 mini generators or alternators 7 could be installed on the stationary baseplate 6. Obviously, the means of mounting the mini generators or alternators 7 and the electrical wiring from each mini generator or alternator 7 is not shown. The stationary baseplate 6, can also have a hollow section, at least the same size as the hole in the hollow circular disk 5, shown in FIG. 8.

Figure 10:
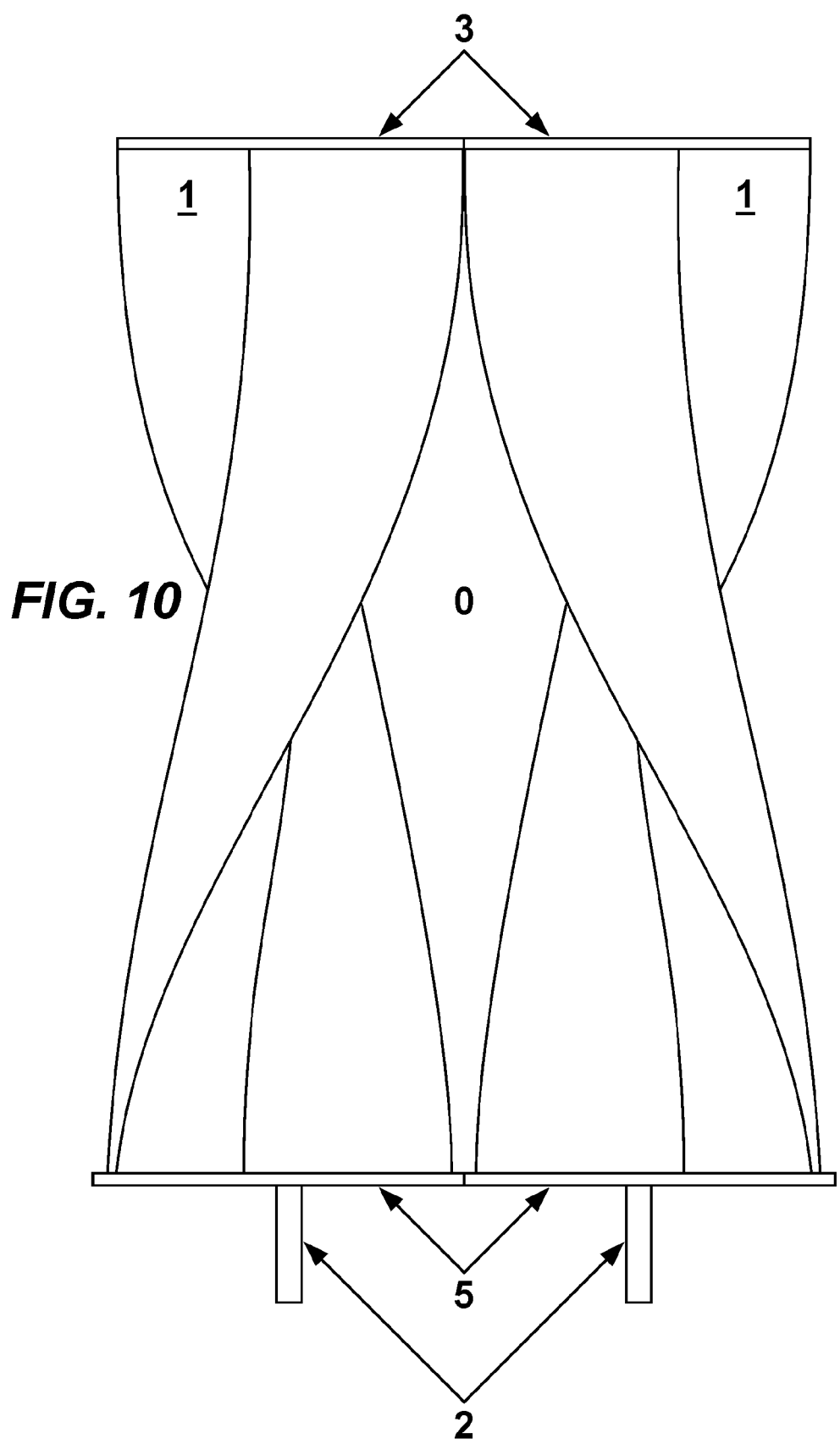
FIG. 10 shows a vertical perspective view of two helix turbines next to each other, one spinning clockwise and the other spinning counterclockwise, where the top two circular disks and bottom two hollow circular discs, with circumferences equal to the circumference of the peripheral edges of the helix turbine's blades, are permanently attached to both ends of the two helix turbines and are in continuous contact while both helix turbines are spinning.

FIG. 10 shows a front vertical perspective view of a two helix turbine 1 assembly with two helical turbines 1 placed next to each other, where one is spinning clockwise and the other is spinning counterclockwise, and where both top circular disks 3, with circumferences at least equal to the circumference of the peripheral edges of the helix turbine's 1 blades, are permanently attached to the tops of the two helix turbines 1 and are in continuous contact while both helix turbines 1 are spinning, and where both bottom hollow circular disks 5, with circumferences at least equal to the circumference of the peripheral edges of the helix turbine's 1 blades, are permanently attached to the bottoms of the two helix turbines 1 and are in continuous contact while both helix turbines 1 are spinning. The space between the two helix turbines 1, where FIG. 10 is labeled and located, is where the oncoming directional fluid interacts with the oncoming helix turbine's 1 blades. This negative interaction produces drag and slows the rotational speed of the helix turbine 1.

Figure 11:
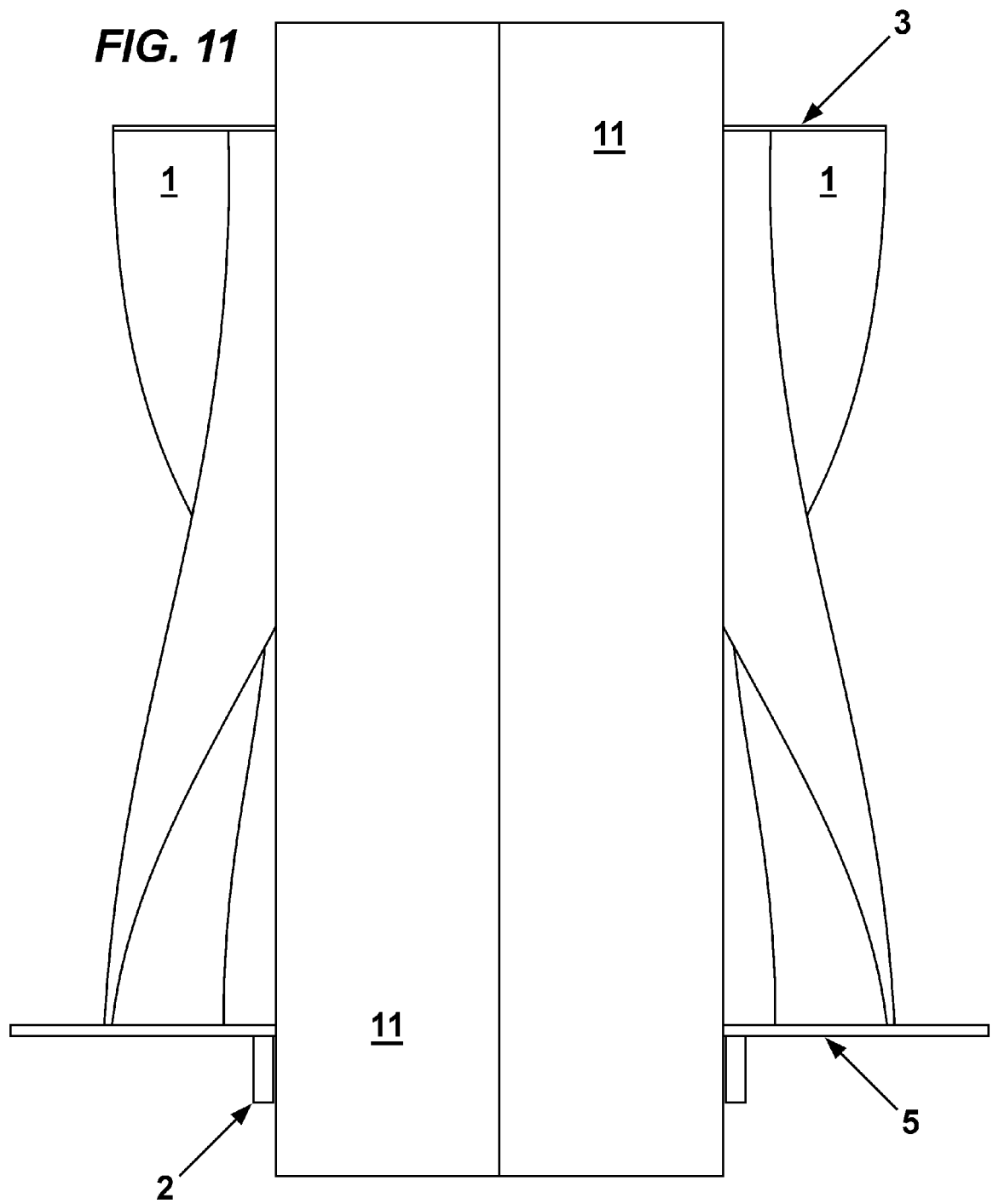
FIG. 11 shows a vertical perspective view of a modified FIG. 10 where the bottom two hollow circular disks, with holes for letting fluid enter through the bottom of each hollow circular disc, have circumferences greater than the circumference of the peripheral edges of the helix turbine's blades, and are permanently attached to the bottom of the helix turbine's blades, and a fluid diverter and concentrator is positioned in front of the dual helix turbine assembly on the windward side to increase fluid speed by diverting fluid flow into the retreating helix turbine's blades and by blocking windward fluid from impacting the oncoming center section of the helix turbine's blades.

FIG. 11, where both bottom hollow circular disks 5, with circumferences larger than the circumference of the peripheral edges of the helix turbine's 1 blades, are permanently attached to the bottoms of the two helix turbines 1 and are in continuous contact while both helix turbines 1 are spinning, and shows a preferably aerodynamically triangular shaped baffle 11 in front of the dual helix turbine 1 assembly, where the oncoming fluid interacts with the oncoming helix turbine's 1 blades, to cancel out the negative interaction between the oncoming directional fluid and the oncoming helix turbine's 1 blades, which produces drag and slows the rotational speed of the dual helix turbine 1 assembly. The aerodynamically triangular shaped baffle 11 in front of the dual helix turbine 1 assembly will increase rotational speed of the helix turbine's 1 blades.

Figure 12:
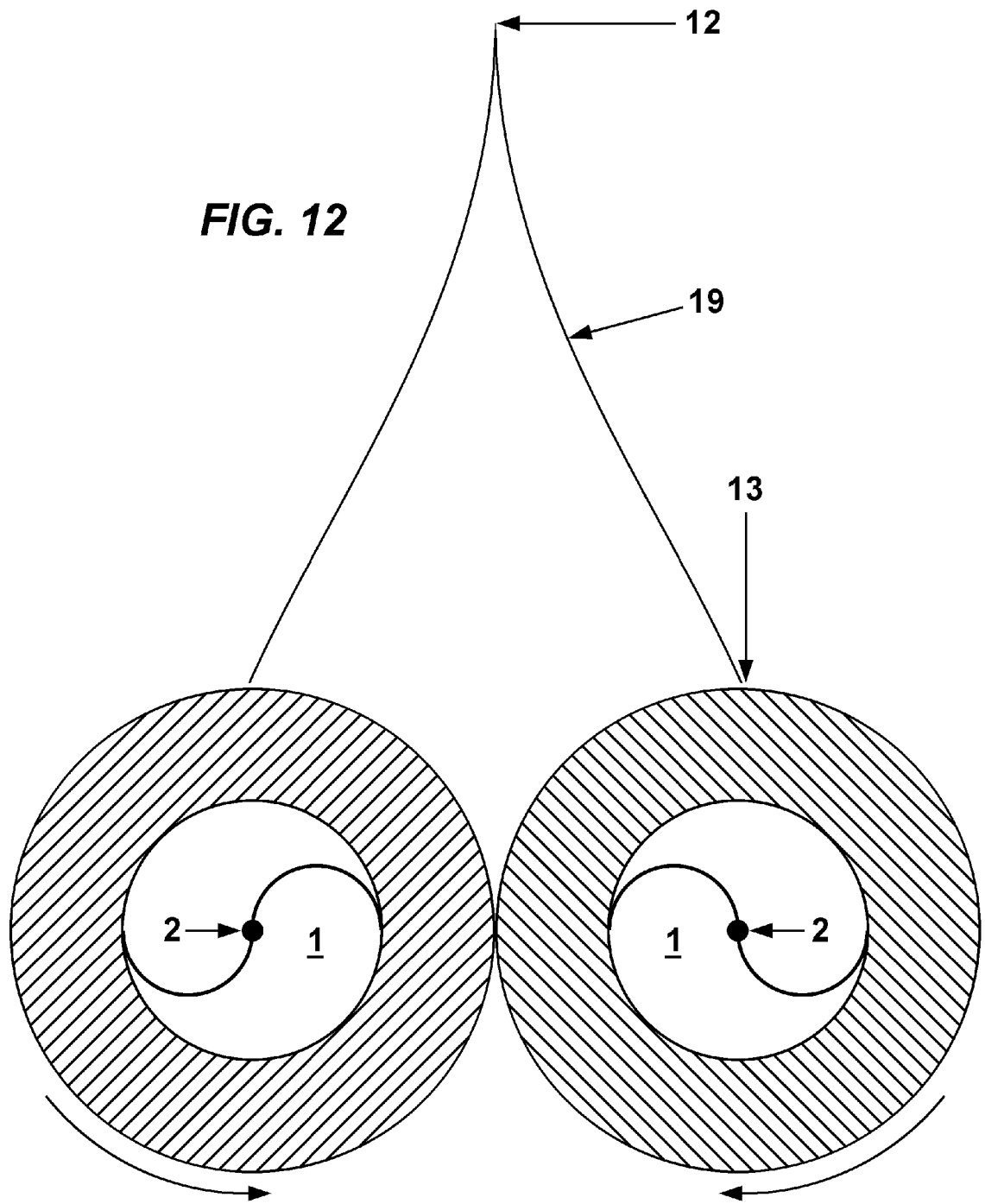
FIG. 12 shows a bottom perspective view of FIG. 11 with the rotation of each of the two helix turbine's blades.

FIG. 12 shows a bottom perspective view of the FIG. 11 dual helix turbine 1 assembly's rotation and where both bottom hollow circular disks 5, have circumferences larger than the circumference of the peripheral edges of the helix turbine's 1 blades, are permanently attached to the bottoms of the two helix turbines 1 and are in continuous contact while both helix turbines 1 are spinning and both top circular disks 3, have circumferences larger than the circumference of the peripheral edges of the helix turbine's 1 blades, are permanently attached to the tops of the two helix turbines 1 and are in continuous contact while both helix turbines 1 are spinning, and the rotation of both helix turbines 1 blades.

Figure 13:
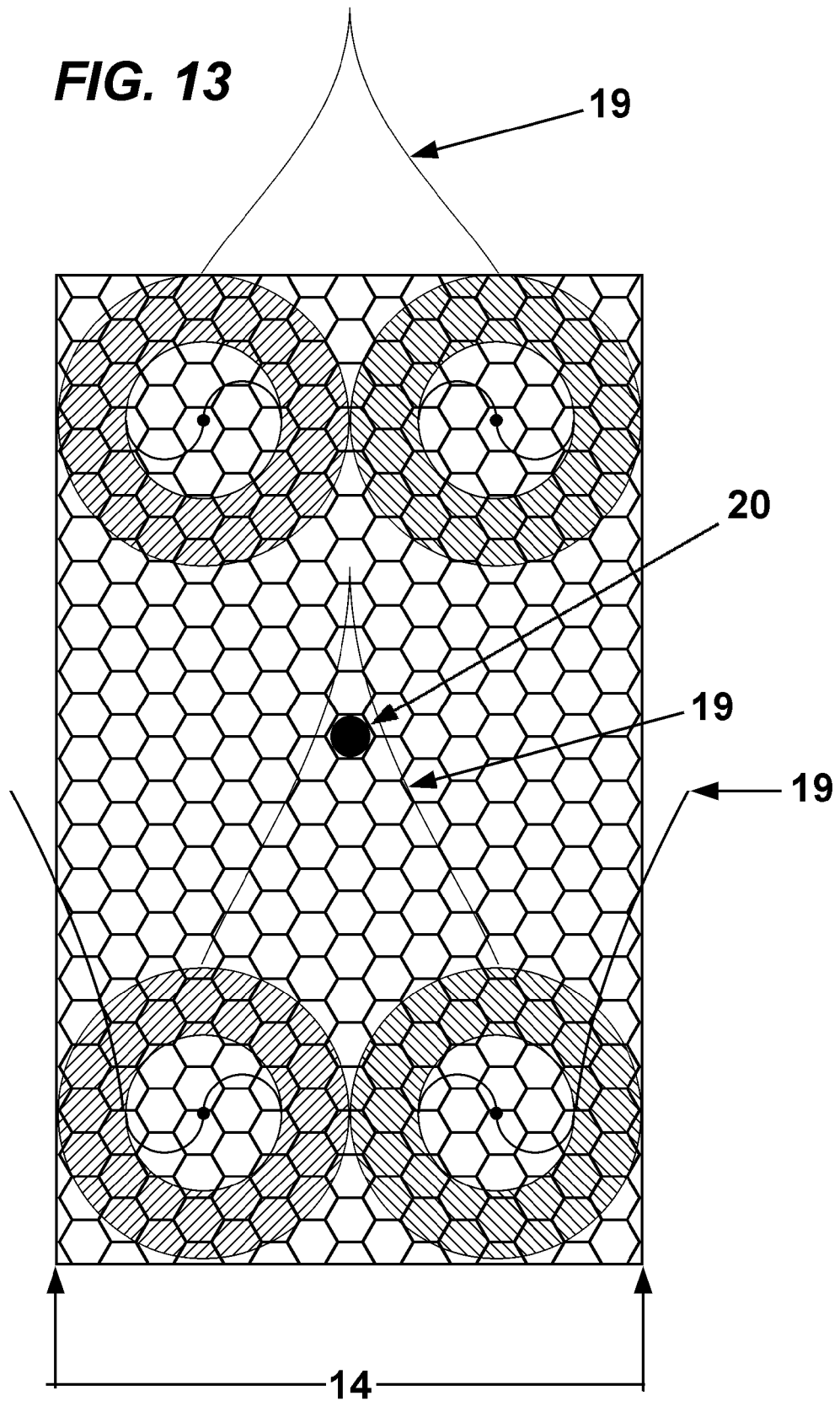
FIG. 13 shows a bottom perspective view of a modified FIG. 12 arrangement mounted on a honeycomb baseplate and secondary, preferably aerodynamic fluid diverters, attached on the outer side edges for diverting and increasing fluid speed entering the back leeward helix turbine's blades and keeping the apparatus pointing into the oncoming fluid.

FIG. 13 shows a bottom perspective view of a dual helix turbine 1 assembly mounted on a honeycomb base 14 using a series of dual helix turbines 1 with preferably aerodynamic fluid diverters 19 for diverting and concentrating fluid into each of the rotating turbine's 1 receding blades. The dual helix turbine 1 assembly's honeycomb base 14 is balanced on a fulcrum pivot point 20 which allows the dual helix turbine 1 assembly to always point into the oncoming wind. The preferably aerodynamic fluid diverters 19 located on the back outside edges of the dual helix turbine 1 assembly always keep the dual helix turbine 1 assembly pointed into the oncoming wind. The preferably aerodynamic fluid diverters 19 located on the back outside edges can also be larger and angled with a larger reach to catch oncoming fluid.

Figure 14:
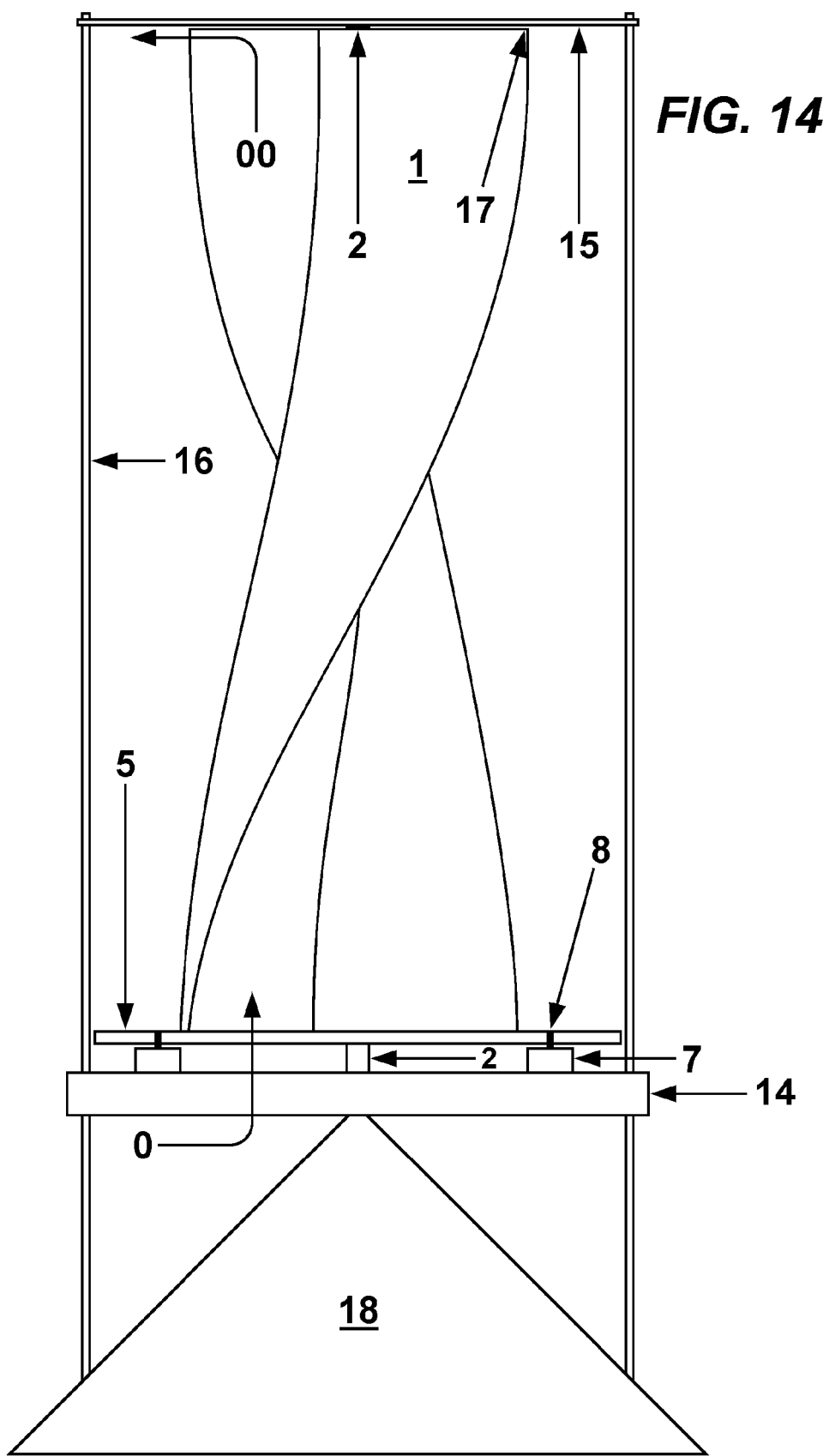
FIG. 14 shows a vertical side perspective view of a helix turbine assembly mounted on a pitched rooftop.

FIG. 14 shows a vertical side perspective view of a helix turbine 1 assembly permanently mounted on a pitched rooftop 18. A helix turbine 1 is centrally located and axially positioned between a top plate 15 and a honeycomb baseplate 14. The helix turbine's 1 rotating axial drive shaft 2 or two axial bearings are centrally located and attached between a top plate 15 and a honeycomb baseplate 14. Wind hitting the pitched rooftop 18 almost doubles in speed as it becomes perpendicularly flowing fluid redirected into an almost axially flowing fluid 0 and is diverted into the bottom of a hollow bottom circular disc 5 with a circumference greater than the circumference of the peripheral edges of the helix turbine 1 attached to the bottom of the helix turbine's blades 9 with holes 10 for letting redirected updraft air 0 enter through the bottom of the honeycomb baseplate 14 and bottom of the helix turbine's blades 1. The axially flowing fluid flowing through the turbine's 1 blades is redirected into a perpendicularly flowing fluid 00 when it comes in contact with the top 15 of the helix turbine 1 assembly and perpendicularly exits the helix turbine 1 blades at the top peripheral edge 17. When a helix turbine 1 assembly does not have a top 15, a circular disk 3 with a circumference equal to the circumference of the peripheral edges of the helix turbine's blades 1 is perpendicularly attached to the top of the helix turbine's blades 1 for diverting the axially flowing fluid, flowing through the turbine's 1 blades, into a perpendicularly flowing fluid 00. The top 15 of the helix turbine 1 assembly is held in place using at least four vertical support rods 16 connected to the pitched rooftop 18 and connected to and running through the honeycomb baseplate 14. The honeycomb baseplate 14 holds the peripheral edges of mini generator's or alternator's 7 drive shafts 8 in continuous contact with peripheral edges of the hollow circular baseplate 5. The best method of continuous contact between the mini generator's or alternator's 7 drive shafts 8 and the hollow circular baseplate 5 is having the hollow circular baseplate's 5 outer edge made with geared teeth and each of the mini generator's or alternator's 7 drive shafts 8 made with the matching geared teeth. The hollow circular baseplate 5 shown, has a circumference larger than the circumference of the peripheral edges of the helix turbine's 1 blades. With the dimensions shown, when the axial drive shaft 2 is rotating at 100 rpm, each mini generator's or alternator's 7 drive shaft 8 is rotating at 7,800 rpm. The more mini generators or alternators 7 attached, the more electricity that can be produced. With the dimensions shown, 36 mini generators or alternators 7 could be installed on the stationary baseplate 6 for generating electricity. Thirty-six mini generators or alternators 7 are cheaper than and produce more electricity than one massive generator or alternator 7A. Generating electricity increases exponentially, based on the circumference of the hollow circular disk 5 attached to the bottom of the helix turbine 1, the circumference of the mini generator's or alternator's 7 axial drive shaft 8 and the number of mini generators or alternators 7 used. Generators or alternators 7 are not waterproof. One method of making the generators or alternators 7 waterproof for outside use is to replace the generator's or alternator's 7 housing with a sealed back and side housing and attaching the generators or alternators 7 upside down to a stationary baseplate 6 or a honeycomb baseplate 14 with the axial drive shafts 8 pointing down and in contact with the peripheral edge of the hollow circular disk 5.

Figure 15:
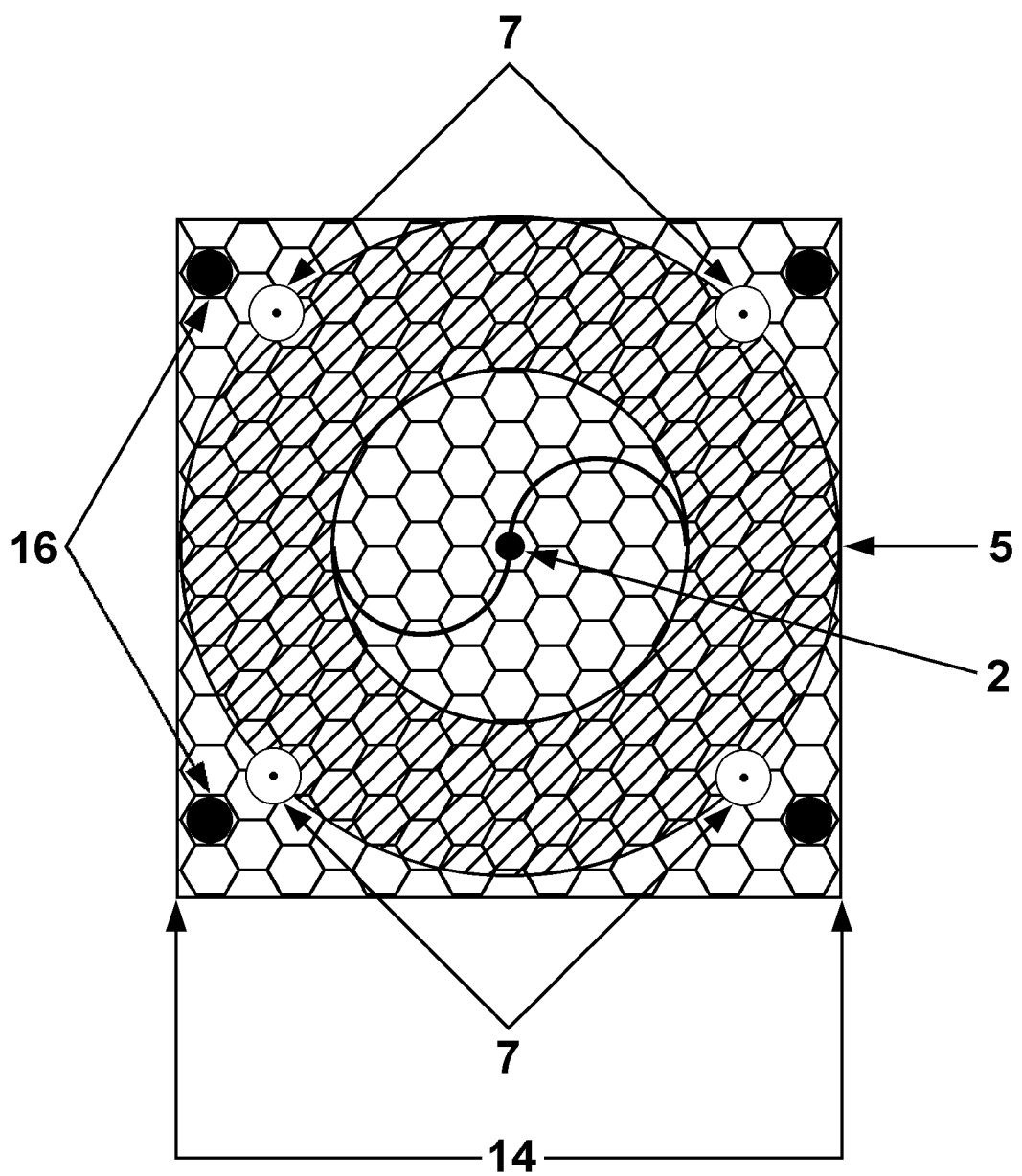
FIG. 15 shows a bottom perspective view of the pitched rooftop mounted helix turbine of FIG. 14 with four mini generators or alternators.

FIG. 15 shows a bottom perspective view of the rooftop mounted helix turbine 1 of FIG. 14 with four mini generators or alternators 7.

Figure 16:
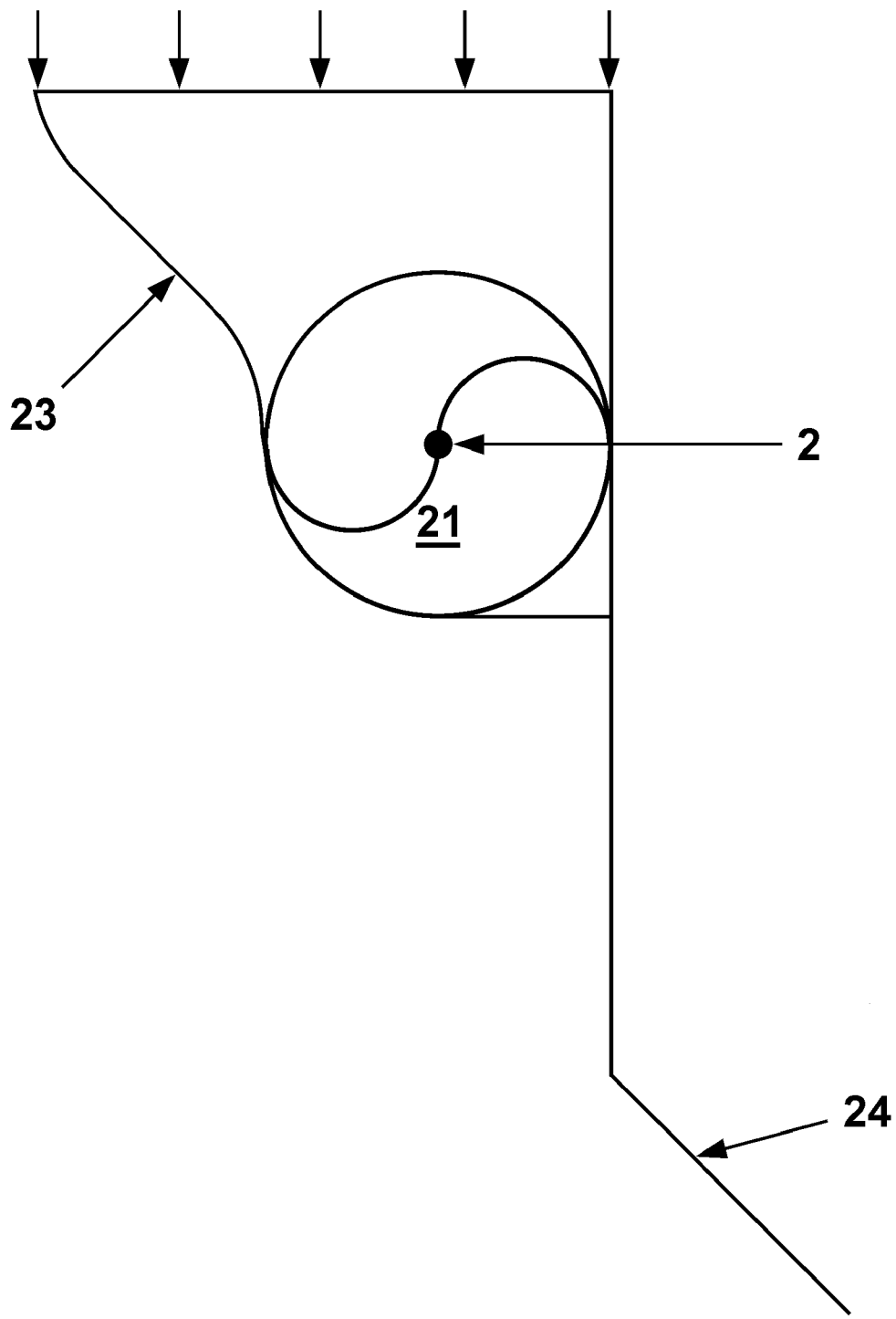
FIG. 16 shows a bottom perspective view of a rotatable aerodynamic shroud encasing a helix turbine with a preferably aerodynamic fluid diverter positioned to block and prevent the oncoming fluid from impacting with the oncoming helix turbine's blades while diverting and concentrating the oncoming fluid into the receding helix turbine's blades, and a preferably aerodynamic fluid diverter positioned on an outside non-linear fluid flow side entering the helix turbine for diverting and concentrating the outer peripheral oncoming fluid into the receding helix turbine's blades. The rotatable aerodynamic shroud encasing includes an offset tail member on a leeward trailing end of the turbine's fluid exiting side for maintaining balanced windward orientation and always facing into the wind. The offset tail member compensates for the oncoming fluid induced torque produced by the outside location of the preferable aerodynamic fluid diverter, which only diverts and concentrates unused non-linear flowing fluid into the helix turbine's blades, increasing fluid flow into the receding helix turbine's blades. The rotatable aerodynamic shroud encasing is rotatably attached to at least one end of the helix turbine assembly at the rotating axial drive shaft fulcrum location.

FIG. 16 shows a bottom perspective view of a rotatable aerodynamic shroud 21 encasing a helix turbine 1 with a preferably aerodynamic fluid diverter 23 positioned on an outside non-linear fluid flow side entering the helix turbine 1 for diverting and concentrating the oncoming fluid into the receding helix turbine's 1 blades. More turbine blades increases the efficiency of the turbine 1 and apparatus assemblies. The rotatable aerodynamic shroud 21 encasing includes an offset tail member 24 on a leeward trailing end of the turbine's fluid exiting side for maintaining balanced windward orientation and always facing into the wind. The offset tail member 24, is longer to compensate for the oncoming fluid induced torque produced by the outside location of the preferable aerodynamic fluid diverter 23, which only diverts and concentrates unused flowing fluid into the helix turbine's 1 blades, increasing fluid flow into the receding helix turbine's 1 blades. The rotatable aerodynamic shroud 21 encasing is rotatably attached to at least one end of the helix turbine 1 assembly at the rotating axial drive shaft 2 fulcrum location. The bottom windward preferably aerodynamic fluid diverter and concentrator 26 for diverting and concentrating outer peripheral oncoming fluid into the receding helix turbine's 1 blades shown in FIG. 16 is not shown in FIG. 18, but is shown in FIG. 19.

Figure 17:
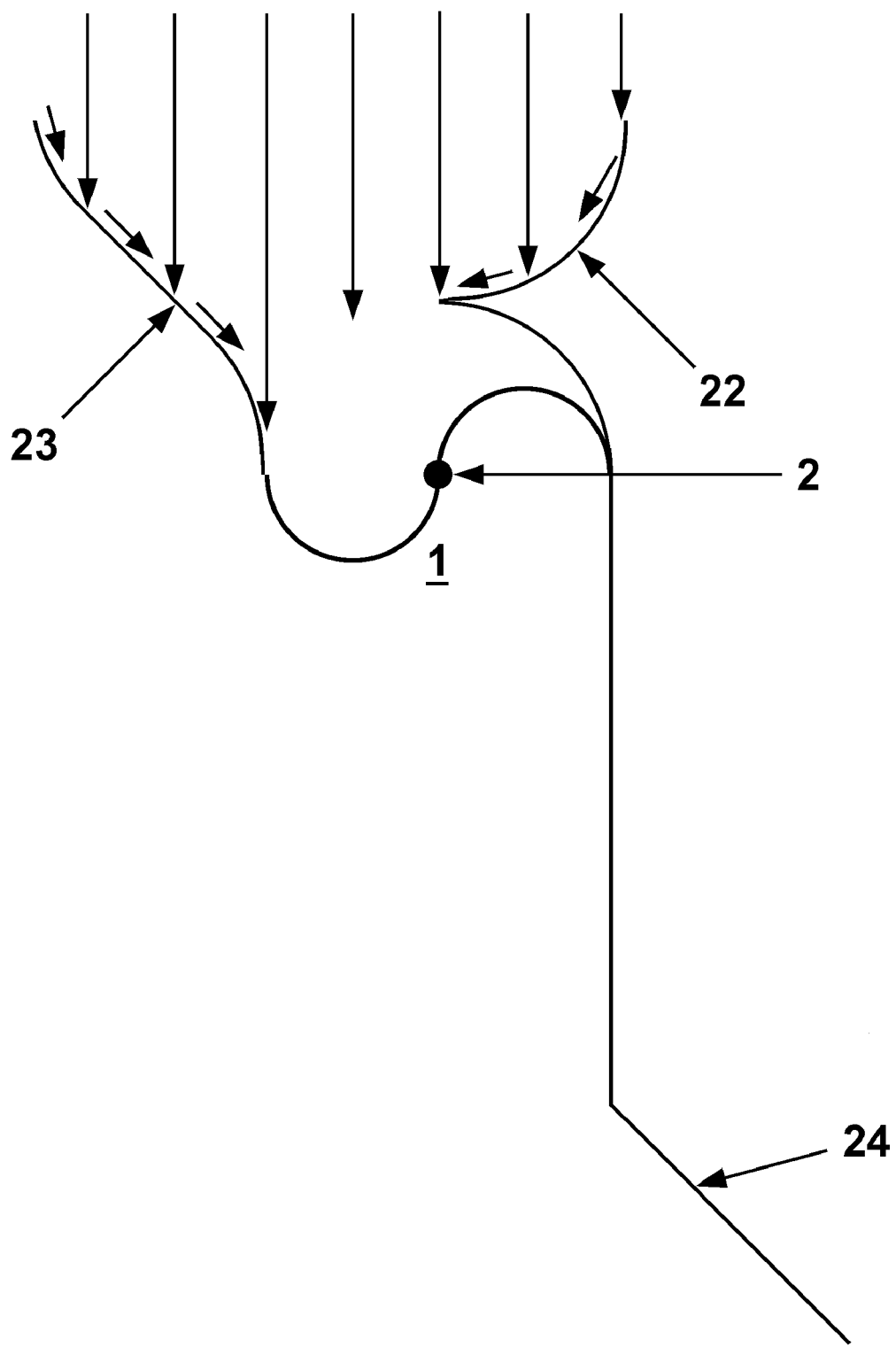
FIG. 17 shows a cross sectional view of FIG. 16. The rotatable aerodynamic shroud encasing has a first preferably aerodynamic fluid diverter is positioned to block and prevent the oncoming fluid from impacting with the oncoming helix turbine's blades while diverting and concentrating the oncoming fluid into the receding helix turbine's blades. A second preferably aerodynamic fluid diverter is positioned on an outside non-linear fluid flow side entering the helix turbine for diverting and concentrating the outer peripheral oncoming fluid into the receding helix turbine's blades. More turbine blades increases the efficiency of the turbine and apparatus assemblies. The rotatable aerodynamic shroud encasing includes an offset tail member on a leeward trailing end of the turbine's fluid exiting side for maintaining balanced windward orientation and always facing into the wind.

FIG. 17 shows a cross sectional view of FIG. 16. The rotatable aerodynamic shroud 21 encasing has a first preferably aerodynamic fluid diverter 22 positioned to block and prevent the oncoming fluid from impacting with the oncoming helix turbine's 1 blades while diverting and concentrating the oncoming fluid into the receding helix turbine's 1 blades. A second preferably aerodynamic fluid diverter 23 positioned on an outside non-linear fluid flow side entering the helix turbine 1 for diverting and concentrating the outer peripheral oncoming fluid into the receding helix turbine's 1 blades. More turbine blades increases the efficiency of the turbine 1 and apparatus assemblies. The rotatable aerodynamic shroud 21 encasing includes an offset tail member 24 on a leeward trailing end of the turbine's fluid exiting side for maintaining balanced windward orientation and always facing into the wind. The offset tail member 24, is longer to compensate for the oncoming fluid induced torque produced by the outside location of the preferable aerodynamic fluid diverter 23, which only diverts and concentrates unused flowing fluid into the helix turbine's 1 blades, increasing fluid flow into the receding helix turbine's 1 blades. The rotatable aerodynamic shroud 21 encasing shown in FIGS. 16 and 17 will greatly increase the efficiency of any omnidirection Savonius type turbine, omnidirection helix turbine or low pressure turbine.

Figure 18:
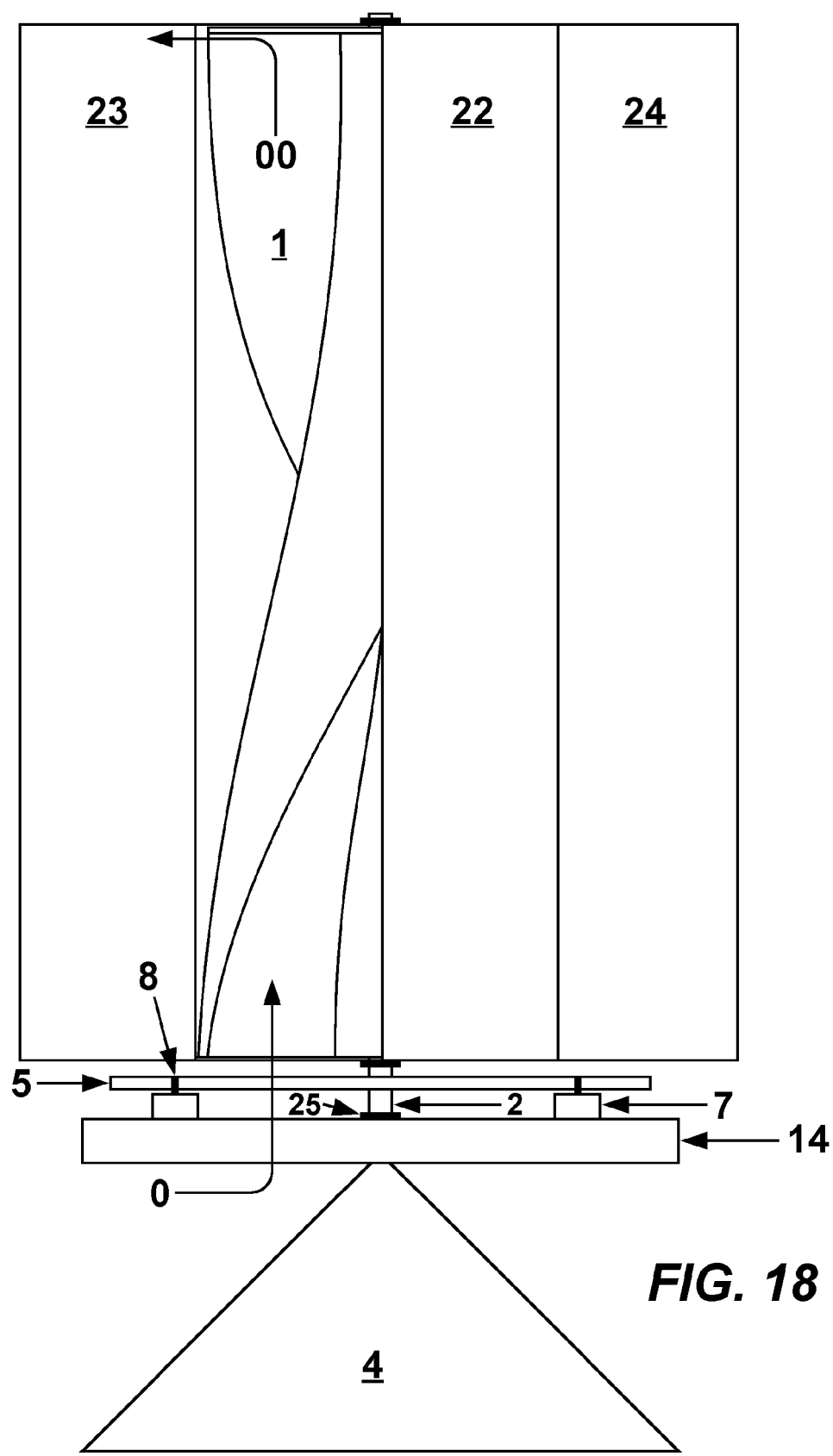
FIG. 18 shows a front vertical perspective view of FIG. 16. The rotatable aerodynamic shroud encasing has a first preferably aerodynamic fluid diverter positioned to block and prevent the oncoming fluid from impacting with the oncoming helix turbine's blades while diverting and concentrating the oncoming fluid into the receding helix turbine's blades. A second preferably aerodynamic fluid diverter positioned on an outside non-linear fluid flow side entering the helix turbine for diverting and concentrating the outer peripheral oncoming fluid into the receding helix turbine's blades. The rotatable aerodynamic shroud encasing includes an offset tail member on a leeward trailing end of the turbine's fluid exiting side for maintaining balanced windward orientation and always facing into the wind. The rotatable aerodynamic shroud encasing is held rotatably in place using a top and bottom rotatable bearing preferably permanently attached to an axial drive shaft.

FIG. 18 shows a front vertical perspective view of a rotatable aerodynamic shroud 21 encasing a helix turbine 1 with a preferably aerodynamic fluid diverter 23 positioned on an outside non-linear fluid flow side entering the helix turbine 1 for diverting and concentrating the outer peripheral oncoming fluid into the receding helix turbine's 1 blades. More turbine blades increases the efficiency of the turbine 1 and apparatus assemblies. The rotatable aerodynamic shroud 21 encasing includes an offset tail member 24 on a leeward trailing end of the turbine's fluid exiting side for maintaining balanced windward orientation and always facing into the wind. The offset tail member 24, is longer to compensate for the oncoming fluid induced torque produced by the outside location of the preferable aerodynamic fluid diverter 23, which only diverts and concentrates unused flowing fluid into the helix turbine's 1 blades, increasing fluid flow into the receding helix turbine's 1 blades. The rotatable aerodynamic shroud encasing is held rotatably in place using a top 25 and bottom 25 rotatable bearing preferably permanently attached to an axial drive shaft 2 fulcrum location. A honeycomb baseplate 14 holds the peripheral edges of mini generator's or alternator's 7 drive shafts 8 in continuous contact with peripheral edges of the hollow circular baseplate 5. The best method of continuous contact between the mini generator's or alternator's 7 drive shafts 8 and the hollow circular baseplate 5 is having the hollow circular baseplate's 5 outer edge made with geared teeth and each of the mini generator's or alternator's 7 drive shafts 8 made with the matching geared teeth. The hollow circular baseplate 5 shown, has a circumference larger than the circumference of the peripheral edges of the helix turbine's 1 blades. Another method of converting the updraft axial flowing fluid into rotational energy is to attach a secondary fan blade to the hollow circular baseplate 5 or to the bottom of the helix turbine's 1 blades (not shown). As shown in FIGS. 17 and 18, the helix turbine's 1 blades have more than triple the amount of fluid energy entering the receding blades 1 and the use of a hollow circular baseplate 5 is not needed in FIGS. 16 and 18, therefore another preferred embodiment of the present invention would include and show a solid bottom stationary baseplate 6 and/or a solid circular baseplate 5.

Figure 19:
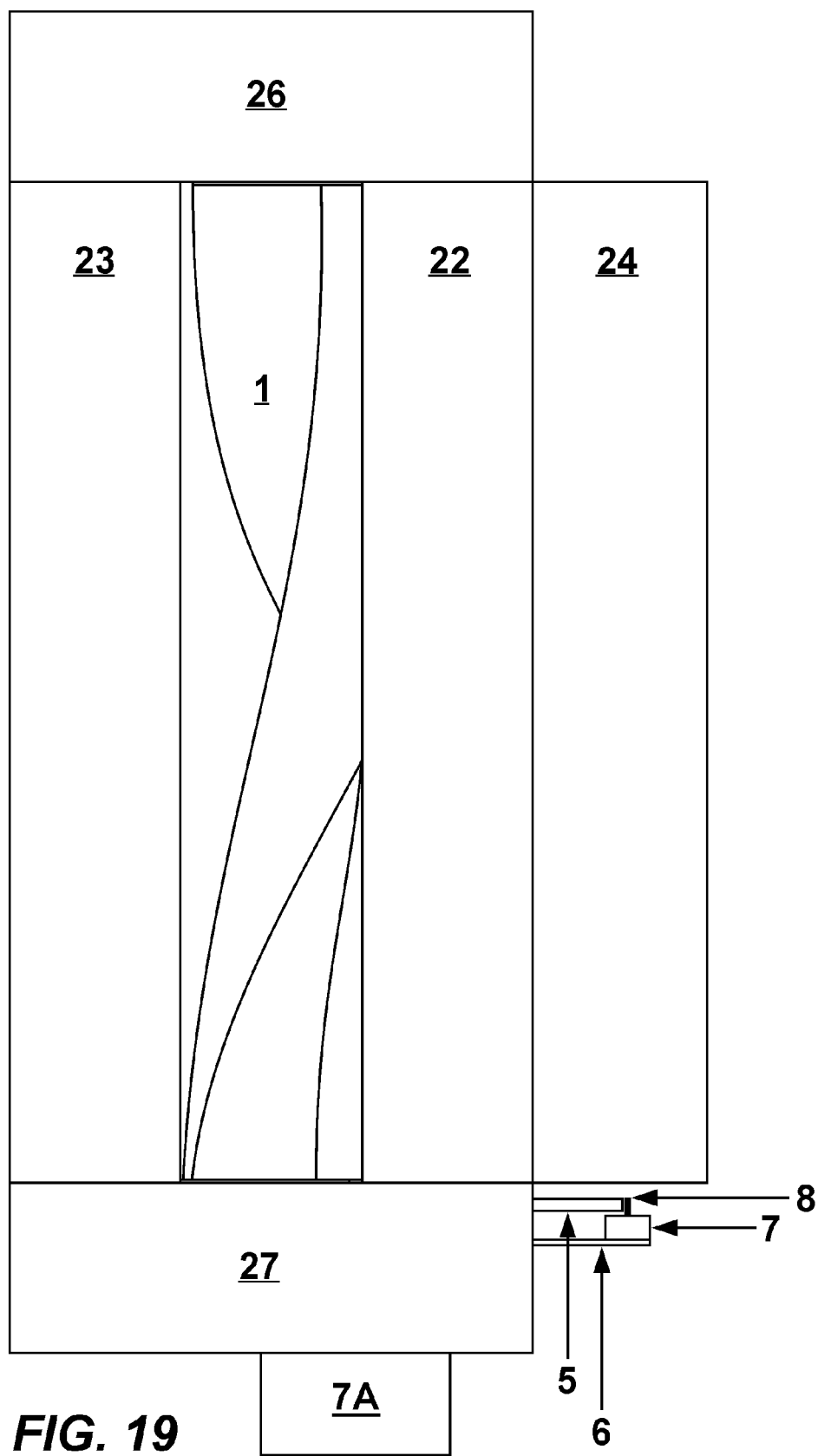
FIG. 19 shows a front vertical perspective view of FIG. 16. where the rotatable aerodynamic shroud encasing has a top and bottom aerodynamic fluid diverter for diverting and concentrating more oncoming fluid into the receding helix turbine's blades.

FIG. 19 shows a front vertical perspective view of a rotatable aerodynamic shroud 21 encasing a helix turbine 1 with a preferably aerodynamic fluid diverter 23 positioned on an outside non-linear fluid flow side entering the helix turbine 1 for diverting and concentrating the outer peripheral oncoming fluid into the receding helix turbine's 1 blades in FIG. 18 also a top windward preferably aerodynamic fluid diverter and concentrator 26 element and a bottom windward preferably aerodynamic fluid diverter and concentrator 27 element for diverting outer peripheral oncoming fluid into the receding helix turbine's blades.

Figure 20:
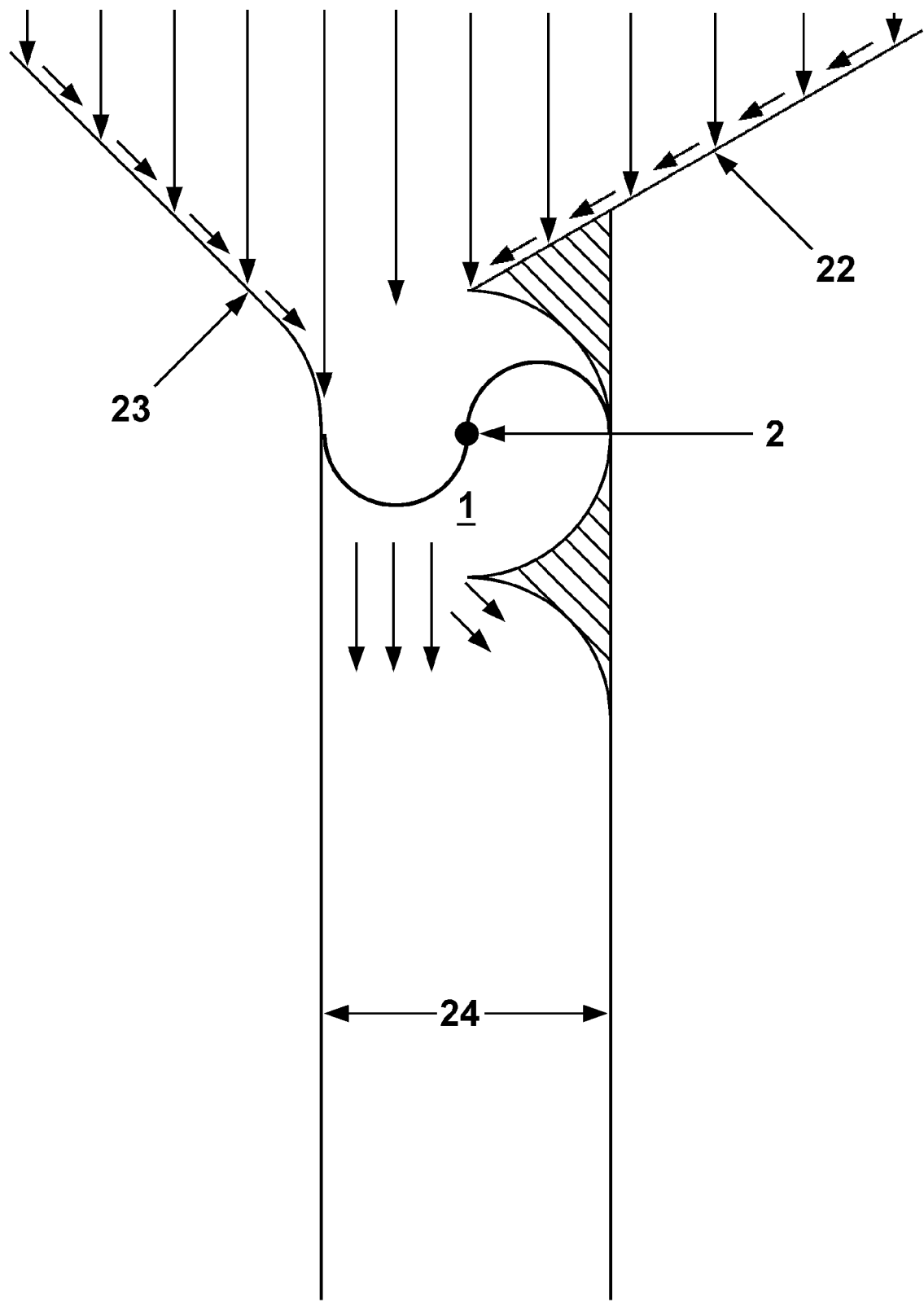
FIG. 20 shows a cross sectional view of another preferred embodiment of the rotatable aerodynamic shroud encasing having a first aerodynamic fluid diverter is positioned to block and prevent the oncoming fluid from impacting with the oncoming helix turbine's blades while diverting and concentrating the oncoming fluid into the receding helix turbine's blades. A second aerodynamic fluid diverter is positioned on an outside non-linear fluid flow side entering the helix turbine for diverting and concentrating the outer peripheral oncoming fluid into the receding helix turbine's blades. The rotatable aerodynamic shroud encasing includes a double tail member on a leeward trailing end of the turbine's fluid exiting side for maintaining balanced windward orientation and always facing into the wind. The rotatable aerodynamic shroud shown increases the amount of fluid entering the receding helix turbine's blades more than six times.

FIG. 20 shows another embodiment of a rotatable aerodynamic shroud 21 where the windward preferably aerodynamic fluid diverter and concentrator 22 for blocking and preventing oncoming fluid from impacting with the oncoming helix turbine's blades and diverting the oncoming fluid into the receding helix turbine's blades and the windward preferably aerodynamic fluid diverter and concentrator 23 for diverting outer peripheral oncoming fluid into the receding helix turbine's blades increase the amount of fluid entering the receding helix turbine's blades more than six times and the leeward tail member fluid diverters 24 keep the mouth of the rotatable aerodynamic shroud 21 continually facing into the windward flow of fluid.

One preferred embodiment of the present invention includes a helix turbine 1 assembly with a circular disk 3, with a circumference at least equal to the circumference of the peripheral edges of the helix turbine's 1 blades perpendicularly and permanently attached to the top of the helix turbine's 1 blades for diverting axially flowing fluid into perpendicularly flowing fluid 00. This will increase the rotational speed of the helix turbine 1. A helix turbine 1 assembly with a circular disk 3 on the top and bottom increase structural rigidity.

Another preferred embodiment of the present invention includes a conical or dome shaped shroud or housing 4, with a bottom edge circumference preferably larger than the circumference of the peripheral edges of the helix turbine's 1 blades with an axial hole larger than the circumference of the drive shaft 2, positioned and secured preferably below the helix turbine 1 blades to convert perpendicularly flowing fluid into axially flowing fluid 0. This will increase the amount of fluid entering the helix turbine's 1 blades and will increase the rotational speed of the helix turbine 1.

Another preferred embodiment of the present invention also includes a helix turbine 1 is permanently attached 9 to a hollow circular baseplate 5, with a circumference at least equal to the circumference of the peripheral edges of the helix turbine's 1 blades, with holes 10 for letting redirected vertical updraft wind 0 enter through the hollow circular baseplate 5 into the bottom of the helix turbine's 1 blades.

Another preferred embodiment of the present invention is where the helix turbine's 1 permanently attached 9 to a hollow circular baseplate 5 with holes 10 for letting redirected vertical updraft wind 0 enter through the hollow circular baseplate 5 into the bottom of the helix turbine's 1 blades, positions the peripheral edges of the hollow circular baseplate 5 in direct contact with the drive shafts 8 of mini generators or alternators 7. The best method of continuous contact between the mini generator's or alternator's 7 drive shafts 8 and the hollow circular baseplate 5 is having the hollow circular baseplate's 5 outer edge made with geared teeth and each of the mini generator's or alternator's 7 drive shafts 8 made with the matching geared teeth. The hollow circular baseplate 5 shown, has a circumference larger than the circumference of the peripheral edges of the helix turbine's 1 blades. With the dimensions shown, when the axial drive shaft 2 is rotating at 100 rpm, each mini generator's or alternator's 7 drive shaft 8 is rotating at 7,800 rpm. The more mini generators or alternators 7 attached, the more electricity that can be produced. With the dimensions shown, 36 mini generators or alternators 7 could be installed on the stationary baseplate 6 for generating electricity. Thirty-six mini generators or alternators 7 are cheaper than and produce more electricity than one massive generator or alternator 7A. Generating electricity increases exponentially, based on the circumference of the hollow circular disk 5 attached to the bottom of the helix turbine 1, the circumference of the mini generator's or alternator's 7 axial drive shaft 8 and the number of mini generators or alternators 7 used.

Another preferred embodiment of the present invention would also include using a two helix turbine 1 assembly with two helical turbines 1 placed next to each other, where one helix turbine 1 is spinning clockwise and the other helix turbine 1 is spinning counterclockwise, and where both top circular disks 3 permanently attached to the tops of the two helix turbines 1 are in continuous contact while both helix turbines 1 are spinning, and where both bottom hollow circular disks 5 permanently attached to the bottoms of the two helix turbines 1 and are in continuous contact while both helix turbines 1 are spinning. The middle space between the two helix turbines 1, where the oncoming directional fluid interacts with the oncoming helix turbine's 1 blades, is blocked with a preferably aerodynamically triangular shaped baffle 11 in front of the dual helix turbine 1 assembly, preventing the oncoming fluid from impacting with the oncoming helix turbine's 1 blades and diverting the oncoming fluid into the receding helix turbine's 1 blades.

Another preferred embodiment of the present invention could be used as a helix turbine 1 assembly mounted on a honeycomb base using a series of helix turbines 1 with preferably aerodynamic fluid diverters 19 for diverting and concentrating fluid into each of the rotating turbine's 1 receding blades. The helix turbine 1 assembly's honeycomb base 14 is balanced on a fulcrum pivot point 20 which allows the helix turbine 1 assembly to always point into the oncoming wind. The preferably aerodynamic fluid diverters 19 located on the back outside edges of the helix turbine 1 assembly always keep the helix turbine 1 assembly pointed into the oncoming wind. The preferably aerodynamic fluid diverters 19 located on the back outside edges can also be larger and angled with a larger reach to catch oncoming fluid.

Another preferred embodiment of the present invention could be used as a pitched rooftop mounted 18 helix turbine 1 assembly for taking advantage of the wind hitting the pitched rooftop 18 almost doubling in speed as it becomes turbulent perpendicularly flowing fluid redirected into an axially flowing fluid 0 diverted flowing through the bottom of a hollow 10 bottom circular disc 5 attached to the bottom of the helix turbine's blades 1 and the honeycomb baseplate 14. The axially flowing fluid flowing through the turbine's 1 blades is redirected into a perpendicularly flowing fluid 00 when it comes in contact with the top 15 of the helix turbine 1 assembly and perpendicularly exits the helix turbine 1 blades at the top peripheral edge 17. When a helix turbine 1 assembly does not have a top 15, a circular disk 3 perpendicularly attached to the top of the helix turbine's blades 1 diverts the axially flowing fluid, flowing through the turbine's 1 blades, into a perpendicularly flowing fluid 00. The top 15 of the helix turbine 1 assembly is held in place using at least four vertical support rods 16 connected to the pitched rooftop 18 and connected to and running through the honeycomb baseplate 14. The honeycomb baseplate 14 holds the peripheral edges of mini generator's or alternator's 7 drive shafts 8 in continuous contact with peripheral edges of the hollow circular baseplate 5. The best method of continuous contact between the mini generator's or alternator's 7 drive shafts 8 and the hollow circular baseplate 5 is having the hollow circular baseplate's 5 outer edge made with geared teeth and each of the mini generator's or alternator's 7 drive shafts 8 made with the matching geared teeth. The hollow circular baseplate 5 shown, has a circumference larger than the circumference of the peripheral edges of the helix turbine's 1 blades. With the dimensions shown, when the axial drive shaft 2 is rotating at 100 rpm, each mini generator's or alternator's 7 drive shaft 8 is rotating at 7,800 rpm. The more mini generators or alternators 7 attached, the more electricity that can be produced. With the dimensions shown, 36 mini generators or alternators 7 could be installed on the stationary baseplate 6 for generating electricity. Thirty-six mini generators or alternators 7 are cheaper than and produce more electricity than one massive generator or alternator 7A. Generating electricity increases exponentially, based on the circumference of the hollow circular disk 5 attached to the bottom of the helix turbine 1, the circumference of the mini generator's or alternator's 7 axial drive shaft 8 and the number of mini generators or alternators 7 used.

Another preferred embodiment of the present invention would preferably use aerodynamic fluid diverters 19 positioned to increase the helix turbine's 1 rotational speed in relation to wind speed and compared to the slower rotational speeds of prior art turbines. A first preferably aerodynamic fluid diverter 11 or 19 is positioned to block and prevent the oncoming fluid from impacting with the oncoming helix turbine's blades 1 and diverting the oncoming fluid into the receding helix turbine's blades 1. A second preferably aerodynamic fluid diverter 19 is positioned on an outside non-linear fluid flow side entering the helix turbine 1 diverts the oncoming fluid into the receding helix turbine's blades 1.

Another preferred embodiment of the present invention would use a horizontal helix turbine assembly 1 preferably mounted on the apex of a roof or preferably on the edges of a flat roof. Preferably aerodynamic fluid diverters 11 or 19 are positioned to block and prevent the oncoming fluid from impacting with the oncoming helix turbine's blades 1 and for diverting the oncoming fluid into the receding helix turbine's blades 1 increases efficiency. A second preferably aerodynamic fluid diverter 19 is positioned on the non-linear fluid flow side entering the helix turbine 1 for diverting the oncoming fluid into the receding helix turbine's blades 1.

These and other features of the present invention will be more fully understood by referencing the drawings.

ADVANTAGES OF THE PRESENT INVENTION

In summary, the present invention, previously described, has provided a helix turbine system and energy production means, where each improvement to a turbine assembly or helix turbine assembly increases the method of extracting and converting the kinetic energy from moving fluids into rotational mechanical energy, therefore increasing the amount of rotations per minute with each improvement. Each of the following turbine assembly elements is an improvement. A solid circular disk with a circumference at least equal to the circumference of the peripheral edges of the turbine or helix turbine perpendicularly and permanently attached to the top of the turbine's or the helix turbine's blades. A conical or dome shaped shroud or housing positioned and secured to at least one end of a turbine or a helix turbine converts perpendicularly flowing fluid into axial flowing fluid. A hollow or solid circular baseplate with a circumference at least equal to the circumference of the peripheral edges of the turbine or the helix turbine perpendicularly and permanently attached to the bottom of the turbine's or the helix turbine's blades and in direct contact with the drive shafts of mini generators or alternators. Two counter rotating turbines or helical turbines where the top and/or bottom edges of circular discs perpendicularly and permanently attached to both ends of the turbine's or the helix turbine's blades and a preferably aerodynamically triangular shaped baffle preventing the oncoming fluid from impacting with the oncoming turbine's or helix turbine's blades and diverting the oncoming fluid into the receding turbine's or helix turbine's blades. A turbine or helix turbine assembly using preferably aerodynamic fluid diverters for deflecting and concentrating fluid entering into each of the rotating turbine's receding blades and for always pointing the fluid intake mouth of the turbine or helix turbine assembly into the oncoming wind. A rooftop mounted turbine or helix turbine assembly for producing electricity using the perpendicularly flowing wind and the accelerated turbulent axially flowing wind hitting the rooftop. The method of generating electricity disclosed, exponentially increases the amount of electricity that one turbine or helix turbine assembly can produce based on the circumference of the hollow or solid circular disk attached to the bottom or top of the turbine or helix turbine, the circumference of the mini generator's or alternator's axial drive shaft and the number of mini generators or alternators used. Using preferably aerodynamic fluid diverters to increase a turbine's rotational speed in relation to wind speed, compared to the slower rotational speeds of prior art turbines. Mounting a turbine or helix turbine horizontally on the apex of a roof or preferably on the edge of a flat roof While the present invention disclosed has been described with reference to the preferred embodiments thereof, a latitude of modification, change, relocation of elements, repositioning of elements and substitution is intended in the foregoing disclosure, and in some instances, some features of the invention will be employed without a corresponding use of the inventions other features. Accordingly, it will be appreciated by those having an ordinary skill in the art that various modifications can be made to the system of the invention and it is appropriate that the description and appended claims are construed broadly and in a manner consistent with the spirit and scope of the invention herein, without departing from the spirit and scope of the invention as a whole.

The invention claimed is:

1. A helical turbine system comprising:
at least two vertical rotatably supported helical vanes twisted around an axis;
said at least two vertical rotatably supported helical vanes attached to a solid axial drive shaft;
at least one rotational bearing attached to at least one end of said solid axial drive shaft;
a first solid disc member attached to a top end of said at least two vertical rotatably supported helical vanes for redirecting axially flowing fluid into perpendicularly flowing fluid;
a rotatable shroud enveloping said at least two vertical rotatably supported helical vanes comprises at least one windward fluid diverter attached between rotatable top and bottom panels for increasing fluid flow into said at least two vertical rotatably supported receding helical vanes;
said rotatable shroud further comprises a windward fluid diverter attached between rotatable top and bottom panels for blocking and preventing fluid from hitting said at least two vertical rotatably supported oncoming helical vanes;
said rotatable shroud further comprises a tail member attached between rotatable top and bottom panels on an opposite trailing fluid exiting side of said rotatable shroud, for maintaining windward orientation.

2. The helical turbine system of claim 1, wherein at least one end of said solid axial drive shaft is directly attached to a generator.

3. The helical turbine system of claim 1, wherein at least one fluid diverter is located on at least one end of said at least two vertical rotatably supported helical vanes for redirecting substantially perpendicularly flowing fluid into axially flowing fluid entering said at least two vertical rotatably supported helical vanes enveloped in said rotatable shroud.

4. The helical turbine system of claim 1, wherein the peripheral edge of a second disc member attached to one end of said axial solid drive shaft, is in contact with at least one solid drive shaft of at least one peripheral generator attached to a stationary base plate.

5. A helical turbine system comprising:
at least two vertical rotatably supported helical vanes twisted around an axis;
said at least two vertical rotatably supported helical vanes attached to a solid axial drive shaft;
at least one rotational bearing attached to at least one end of said solid axial drive shaft;
a first solid disc member attached to a top end of said at least two vertical rotatably supported helical vanes for redirecting axially flowing fluid into perpendicularly flowing fluid; and
the peripheral edge of a second disc member attached to one end of said axial solid drive shaft, is in contact with at least one solid drive shaft of at least one peripheral generator attached to a stationary base plate.

6. The helical turbine system of claim 5, wherein said first solid disc member attached to said top end of said at least two vertical rotatably supported helical vanes has a circumference at least equal to the circumference of the peripheral edges of said at least two vertical rotatably supported helical vanes.

7. The helical turbine system of claim 5, wherein at least one fluid diverter is located on at least one end of said at least two vertical rotatably supported helical vanes for redirecting substantially perpendicularly flowing fluid into axially flowing fluid entering said at least two vertical rotatably supported helical vanes.

8. The helical turbine system of claim 5, wherein a hollow disc member is attached to a bottom end of said axial solid drive shaft allowing axially flowing fluid to enter the bottom end of said at least two vertical rotatably supported helical vanes.

9. The helical turbine system of claim 5, wherein at least one end of said solid axial drive shaft is directly attached to a generator.

10. The helical turbine system of claim 5, further comprises:
a rotatable shroud enveloping said at least two vertical rotatably supported helical vanes comprises at least one windward fluid diverter attached between rotatable top and bottom panels for increasing fluid flow into said at least two vertical rotatably supported receding helical vanes;
said rotatable shroud further comprises a windward fluid diverter attached between rotatable top and bottom panels for blocking and preventing fluid from hitting said at least two vertical rotatably supported oncoming helical vanes; and
said rotatable shroud further comprises a tail member attached between rotatable top and bottom panels on an opposite trailing fluid exiting side of said rotatable shroud, for maintaining windward orientation.

11. A helical turbine system comprising:
at least two vertical rotatably supported helical vanes twisted around an axis;
said at least two vertical rotatably supported helical vanes attached to a solid axial drive shaft;
at least one rotational bearing attached to at least one end of said solid axial drive shaft; and
a first solid disc member attached to a top end of said at least two vertical rotatably supported helical vanes for redirecting axially flowing fluid into perpendicularly flowing fluid.

12. The helical turbine system of claim 11, wherein at least one end of said axial solid drive shaft is attached to a generator.

13. The helical turbine system of claim 11, wherein said first solid disc member attached to said top end of said at least two vertical rotatably supported helical vanes has a circumference at least equal to the circumference of the peripheral edges of said at least two vertical rotatably supported helical vanes.

14. The helical turbine system of claim 11, wherein at least one fluid diverter is located on at least one end of said at least two vertical rotatably supported helical vanes for redirecting substantially perpendicularly flowing fluid into axially flowing fluid entering said at least two vertical rotatably supported helical vanes.

15. The helical turbine system of claim 11, wherein the peripheral edge of a second disc member attached to one end of said axial solid drive shaft, is in contact with at least one solid drive shaft of at least one peripheral generator attached to a stationary base plate.

16. The helical turbine system of claim 11, wherein a rotatable shroud enveloping said at least two vertical rotatably supported helical vanes comprises at least one windward fluid diverter attached between rotatable top and bottom panels for increasing fluid flow into said at least two vertical rotatably supported receding helical vanes.

17. The helical turbine system of claim 11, wherein a rotatable shroud enveloping said at least two vertical rotatably supported helical vanes comprises a windward fluid diverter attached between rotatable top and bottom panels for blocking and preventing fluid from hitting said at least two vertical rotatably supported oncoming helical vanes.

18. The helical turbine system of claim 11, wherein a rotatable shroud enveloping said at least two vertical rotatably supported helical vanes comprises a tail member attached between rotatable top and bottom panels on an opposite trailing fluid exiting side of said rotatable shroud, for maintaining windward orientation.

19. The helical turbine system of claim 11, wherein a rotatable shroud enveloping said at least two vertical rotatably supported helical vanes comprises an open second end allowing substantially axial flowing fluid to enter a bottom end of at least two vertical rotatably supported helical vanes.

20. The helical turbine system of claim 11, wherein a second hollow disc member is attached to at least one end of said solid axial drive shaft and the peripheral edge is in contact with at least one solid drive shaft of at least one peripheral generator attached to a stationary base plate.

* * * * *